United States Patent
Oates

(10) Patent No.: US 12,141,819 B2
(45) Date of Patent: Nov. 12, 2024

(54) SYSTEMS, METHODS, AND TECHNIQUES FOR DETERMINING LOCATIONAL MARGINAL EMISSION RATES IN AN ELECTRIC POWER SYSTEM

(71) Applicant: REsurety, Inc., Boston, MA (US)

(72) Inventor: David Luke Oates, Boston, MA (US)

(73) Assignee: REsurety, Inc., Boston, MA (US)

( * ) Notice: Subject to any disclaimer, the term of this patent is extended or adjusted under 35 U.S.C. 154(b) by 520 days.

(21) Appl. No.: 17/649,060

(22) Filed: Jan. 26, 2022

(65) Prior Publication Data

US 2022/0253869 A1 Aug. 11, 2022

Related U.S. Application Data

(60) Provisional application No. 63/147,647, filed on Feb. 9, 2021.

(51) Int. Cl.
| | |
|---|---|
| *G06Q 30/0204* | (2023.01) |
| *G06Q 30/018* | (2023.01) |
| *G06Q 30/0201* | (2023.01) |
| *G06Q 50/06* | (2024.01) |

(52) U.S. Cl.
CPC ........ *G06Q 30/018* (2013.01); *G06Q 30/0205* (2013.01); *G06Q 30/0206* (2013.01); *G06Q 50/06* (2013.01); *Y02E 20/32* (2013.01)

(58) Field of Classification Search
CPC ............ G06Q 30/018; G06Q 30/0205; G06Q 30/0206; G06Q 50/06; Y02E 20/32
See application file for complete search history.

(56) References Cited

U.S. PATENT DOCUMENTS

| | | | |
|---|---|---|---|
| 2008/0183523 A1* | 7/2008 | Dikeman | G06Q 10/06 705/7.41 |
| 2017/0285081 A1 | 10/2017 | Silverman | |
| 2020/0372588 A1* | 11/2020 | Shi | G06Q 50/06 |

FOREIGN PATENT DOCUMENTS

CN 110048413 7/2019

OTHER PUBLICATIONS

Chalendar, et al., "Why 100% Renewable Energy is not Enough", Joule, Commentary, vol. 3, Issue 6, p. 1389-1393, Jun. 19, 2019.
(Continued)

*Primary Examiner* — Charles Cai
(74) *Attorney, Agent, or Firm* — Stoel Rives LLP

(57) ABSTRACT

Systems, methods, and techniques are disclosed whereby locational marginal emission rates may be determined for each location (or node) of an electric power generation and distribution system using Real-Time Market data provided by a power system market operator, along with marginal offer estimate data and generator emission data. Noisy and incomplete input data can be appropriately handled to allow use of Real-Time Market data. The effect of congestion (violated constraints) can also be removed.

20 Claims, 6 Drawing Sheets

(56) References Cited

OTHER PUBLICATIONS

Johnsson, et al., "Marginal Abatement Cost Curve of Industrial CO2 Capture and Storage—A Swedish Case Study", Frontiers in Energy Research, Aug. 2020, vol. 8, Article 175.

Li, et al., "Carbon Flow Tracing Method for Assessment of Demand Side Carbon Emissions Obligation", IEEE Transactions on Sustainable Energy, vol. 4, No. 4, Oct. 2013.

Lindberg, et al., "The Environmental Potential of Hyper-Scale Data Centers: Using Location Marginal CO2 Emissions to Guide Geographical Load Shifting", University of Wisconsin-Madison, Oct. 7, 2020.

Xia, "100% renewables doesn't equal zero-carbon energy, and the difference is growing", May 24, 2019, Precourt Institute for Energy, Stanford Energy, Stanford University.

\* cited by examiner

SYSTEMS, METHODS, AND TECHNIQUES FOR DETERMINING LOCATIONAL MARGINAL EMISSION RATES IN AN ELECTRIC POWER SYSTEM

RELATED APPLICATIONS

This application claims the benefit under 35 U.S.C. § 119(e) of U.S. Provisional Patent Application No. 63/147,647, titled "SYSTEMS, METHODS, AND TECHNIQUES FOR DETERMINING LOCATIONAL MARGINAL EMISSION RATES IN AN ELECTRIC POWER SYSTEM," filed Feb. 9, 2021, which is hereby incorporated by reference herein in its entirety.

TECHNICAL FIELD

The present disclosure relates generally to the field of electric power generation and transmission. More particularly, the present disclosure relates to systems and methods of determining locational marginal pollutant emission rates of an electrical power system.

BACKGROUND

Carbon ($CO_2$) emissions from the electricity sector account for about a third of the total $CO_2$ emissions in the U.S. Other pollutants from the electricity sector can be or may become comparatively problematic. A key tool of relevant decision-makers related to reduction of $CO_2$ emissions (and other pollutant emissions) is to deploy clean electricity resources, e.g., wind turbine power generators, solar power generators. Currently, the contribution of clean power generation to reducing $CO_2$ emissions is usually calculated using an aggregate $CO_2$ emissions factor for the system in which the clean power generator is installed. At present, there are not effective systems and methods to determine the contribution toward $CO_2$ emissions reduction of a specific clean power generator. Thus, the motivation to use particularly $CO_2$-abative clean power generation in a system is substantially diluted.

SUMMARY

The present disclosure provides for systems and methods by which can be determined the contribution of conditions at locations of an electrical power system toward pollutant emissions.

BRIEF DESCRIPTION OF THE DRAWINGS

The written disclosure herein describes illustrative embodiments that are non-limiting and non-exhaustive. Reference is made to certain of such illustrative embodiments that are depicted in the accompanying drawings, in which.

DETAILED DESCRIPTION OF PREFERRED EMBODIMENTS

Figure 1:
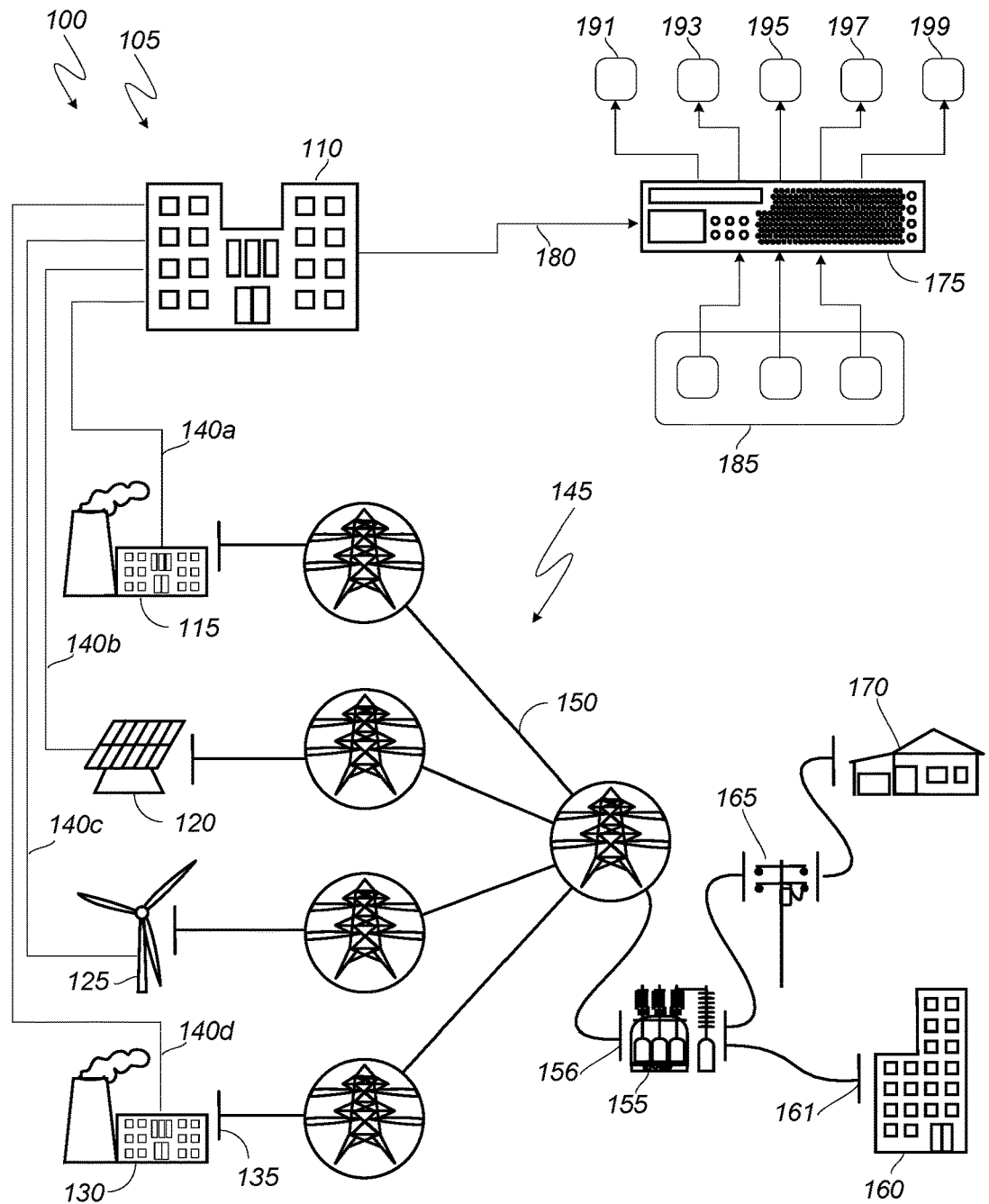
FIG. 1 is a diagram of a system for determining a locational marginal carbon emission rate for each location of an electric power system (EPS), according to an embodiment of the present disclosure.

Current methods of determining pollutant emission reductions associated with the introduction of a clean power generator, or emissions attributable to power consumption, entail using system-average emissions rate estimation, or a marginal emissions rate estimation (often based on statistical or market simulation of fossil generator dispatch). Although locational emissions rates can theoretically be determined using a direct current optimal power flow (DC-OPF) sensitivity, there are several barriers to application of this method at scale. Direct application of the DC-OPF sensitivity requires the full solution of a large-scale power system model. Such models are laborious and costly to develop, maintain, and solve. They also involve many unobservable inputs, such as the complete system topology and nodal load distributions, reducing the accuracy of that method. In practice, the DC-OPF sensitivity method cannot be applied directly to the limited data released by market operators.

The present disclosure builds on the DC-OPF sensitivity approach, using nodal data available from the actual Real-Time Market, and avoiding the need to maintain and solve a parallel model. While reference is made to carbon throughout the disclosure, this is by way of example (as carbon is of high concern) and not by way of limitation, as the systems and methods herein disclosed can be applied with regard to other pollutants (e.g., sulfur dioxide ($SO_2$), nitrogen oxides (NO, $NO_2$)) and can be applicable in industries other than electric power generation and transmission.

The present disclosure provides for systems and methods by which the contribution of each discrete location of an electrical power system toward pollutant (e.g., $CO_2$) emissions can be determined. The systems and methods herein disclosed can permit determination of a reduction of $CO_2$ emission achieved by each clean power generator node (location) of the electrical power system, as compared to estimating the reduction of $CO_2$ emission on an aggregate basis.

Although embodiments are described herein in terms of emissions rates, these embodiments can similarly be thought of as producing abatement rates. Emissions rates typically describe the emissions of a pollutant associated with a unit of power consumption, often at a specific location at a specific moment in time. Abatement rates typically describe the reduction in emissions of a pollutant associated with a unit of power generation. For example, the application of an embodiment described herein might produce a value of 0.4 tonne $CO_2$/MWh at a specific location at a specific moment in time. This value could be interpreted as an emissions rate: 1 MWh of power consumption would lead to 0.4 tonnes of $CO_2$ emissions. This value could also be interpreted as an abatement rate: 1 MWh of clean energy production would reduce $CO_2$ emissions by 0.4 tonnes.

As used herein, the term "independent system operator" (ISO) refers to an entity that coordinates, controls and monitors electric power transmission from a plurality of electric power generation entities serving a broad area, potentially, multi-state in scope. Regional transmission organization (RTO) refers to an entity that conducts a range of similar functions. Within a given geographic area, ISO and RTO functions are generally conducted by the same entity and for the purposes of the present disclosure, the term "ISO" is intended to encompass RTO.

As used herein, the term "Real-Time Market" (RTM) refers to its ordinary meaning in the field of electric power generation and distribution, wherein the electric power market is cleared (and data are generated) at fixed reporting intervals (e.g., every five minutes) throughout an operating day, the resulting output data reflecting the conditions of the generation and transmission system for at least the most recent reporting interval. By comparison, the Day-Ahead Market (DAM) is based on anticipated conditions of the electric power market for the following day. At least some ISOs provide RTM results in five-minute intervals, as compared to DAM results showing hourly granularity over the next 24 hours.

As used herein, "unit" refers to an electric power generator of any type (e.g., gas, coal, wind, etc.) capable of generating electric power and injecting the power into a power transmission network. A unit is the smallest element of power generation that can be independently controlled or measured. A "plant" may include one or more units, usually on the same physical site.

A "marginal unit" refers to one of a set of generating resources that can appropriately (e.g., cost-effectively from the perspective of the operator) respond to a perturbation in power injection or demand at any location in the power system. A marginal unit is a unit that is marginal at a particular moment in time. In other words, "marginal" describes a possible state of a unit at a moment in time. A unit may be marginal at one moment, and non-marginal at another. Some units may never be marginal. Marginality is a concept related to the market for electricity, rather than the physical electric infrastructure. A "marginal unit" may be a unit that will participate in serving the next increment of consumption because its cost of production is equal to the price of power.

A "location" refers to an electrical location, and, more particularly, to a single element of an electric power generation and transmission system, for example, a single generator of electric power (e.g., a unit), a point of connection of a wire to a consuming device, a point of connection between two wires, a high side of a transformer, or a low side of a transformer. A "node" or "bus" of an electric power generation and transmission network refers to any vertex of that network. The locations described above generally constitute nodes. For the purposes of the present disclosure, the term "location" encompasses the meaning of "node" and "bus." As used herein, "locational" refers to data or other information about or otherwise related to a particular location.

As used herein, the term "constraint" has its ordinary meaning in the field of electric power generation and transmission, and may comprise base flow transmission constraints, transmission security constraints, nomogram constraints, transformer limits, etc. A constraint may be violated, binding or not binding. A constraint is applied to a component of an electric power generating system or of a power transmission network. A constraint becomes violated when a parameter associated with the element to which the constraint applies, e.g., a nominal maximum power rating, is exceeded. By comparison, a constraint is a binding constraint when the relevant parameter is met but not exceeded.

FIG. 1 is a diagram of a system 100 for determining a locational marginal carbon emission rate (LMCER system 100) for each location (e.g., a unit 115, 120, 125, 130, a node 156, 161) of an EPS 105 of an ISO 110, according to an embodiment of the present disclosure. The ISO 110 comprises a number of units 115, 120, 125, 130 capable of generating electric power and injecting the electric power into the EPS 105. The ISO 110 further comprises an electric power transmission system 145, one power transmission segment 150 of which is identified for reference. A high voltage transformer 155 is shown, capable of stepping down the electric power from the EPS 105 for delivery to a commercial or industrial power consumer 160; and a low voltage transformer 165 capable of stepping down the electric power from the EPS 105 for delivery to a residential consumer 170. The illustration of the ISO 110 and the EPS 105 in FIG. 1 is not intended to be a comprehensive representation of an ISO or EPS, and is for convenience of the disclosure and not by way of limitation. The units 115, 120, 125, 130, the transformers 155, 165, and the consumers 160, 170 are shown having a bus, with the bus 135 of the unit 130 identified for reference. Each of the transformers 155, 165 is shown with two buses, representing an input phase from the EPS 105 and an output phase for the relevant consumer 160, 170. The EPS 105 further includes a reference bus, as is well known in the art. The reference bus for the EPS 105 is taken to be a distributed reference bus, and is not represented in the figure.

The unit 115 represents a coal-fired electric power generator. The unit 120 represents a solar-powered electric power generator. The unit 125 represents a wind-powered electric power generator. The unit 130 represents a gas-fired electric power generator. The EPS 105 of the ISO 110 may comprise additional electric power generators of any type. Each unit 115, 120, 125, 130 may be capable of appropriately (e.g., cost-effectively as considered by the operator) responding to changes in power injections or withdrawals at a location in the network. For example, the units 115, 120, 125, and 130 may be capable of cost-effectively responding to changes in power injections or withdrawals and could potentially be marginal units. The EPS 105 of the ISO 110 further comprises constraints. A constraint may be a limitation not to be exceeded. By way of example, the power transmission segment 150 may comprise a power conduit with a maximum power rating of 500 MW not to be exceeded under normal operating conditions. (The same conduit may have a second power rating, such as a never-exceed rating, and may also be a monitored or contingent element of a contingency constraint.) As a further example, the transformer 155 may have a constraint whereby a maximum amount of power delivered to the transformer 155 at transmission voltage (e.g., 115 kV) can be stepped down to, e.g., 33 kV distribution voltage. Other constraints known in the art are within the scope of this disclosure.

Each unit 115, 120, 125, 130 has a communication interface 140a-140d, respectively, whereby the particular unit 115, 120, 125, 130 may communicate with the ISO 110. More particularly, each unit 115, 120, 125, 130 may communicate, via the respective communication interface 140a-140d, data to the ISO 110, the data comprising a wide variety of operational information, such as, e.g., current power production, current constraints related to the particular unit 115, 120, 125, 130, offer prices, etc. Constraints related to the particular unit 115, 120, 125, 130 may comprise constraints physically at the unit 115, 120, 125, 130, constraints in a power transmission segment associated with the unit 115, 120, 125, 130, etc. These data may be communicated to the ISO 110 in real time, or near real time, and may be used by the ISO 110 to generate Real-Time Market (RTM) data at fixed time intervals (e.g., every five minutes).

The RTM data may be communicated, via a network interface 180, from the ISO 110 to a computing system 175 of the LMCER system 100. The network interface 180 may be configured (or configurable) to facilitate communication between the computing system 175 and the ISO 110 (and other entities) via a private network infrastructure, a virtual private network, a cloud-based network, etc. The computing system 175 comprises at least a non-transitory memory (e.g., a hard drive, a solid-state drive (SSD), a flash memory, a compact disc read-only memory (CD-ROM)) capable of storing computer-readable and executable instructions, a processor capable of executing the computer-readable and executable instructions, a memory capable of storing results of the processor executing the computer-readable and executable instructions, a communication interface capable of facilitating communication between the processor and each memory, a communication interface capable of facilitating communication between the computing system 175 and the ISO 110 and other entities. Furthermore, the computing system 175 may comprise firmware capable of storing computer-readable and executable configuration and operation instructions. The computer-readable and executable instructions of the memory may be software. In one embodiment, the computing system 175 may be a general purpose computer which, upon startup, accesses the firmware and/or software whereby the computing system 175 is particularly configured to perform the methods hereafter described. In one embodiment, the computing system 175 may be a purpose-built computer that has been particularly configured to perform the methods hereafter described. The computing system 175 may be a distributed computing system (e.g., a cloud-based computing system). The computing system 175 acquires, via the network interface 180, the RTM data from the ISO 110, which may be made available at generally fixed intervals, the fixed intervals responding to the intervals at which the ISO 110 generates the RTM data (e.g., every five minutes) and releases the RTM data. The computing system 175 may acquire data from other sources or means 185. The other sources or means 185 may include one or more third-party vendors providing data related to operation of the ISO 110, or of particular elements of the ISO 110 (e.g., pertaining to any one or more of the units 115, 120, 125, 130), etc. The other sources or means 185 may further comprise manipulation of acquired data to develop further data. The processor of the computing system 175, through execution of the computer-readable and executable instructions, may manipulate and transform the acquired data to produce locational carbon emission rates data.

The computing system 175 may then provide the locational carbon emission rates data to one or more parties 191-199. The following examples of parties 191-199 are offered for reference and not by way of limitation. One party (of the parties 191-199) may be an owner/operator of a particular unit 115, 120, 125, 130, who may utilize the data to make decisions regarding maintenance, replacement, upgrade, etc., of the unit 115, 120, 125, 130. A party may consume power at a location. A party may be a prospective owner/operator of a potential new unit considering the type of technology and/or location of the new unit. A party may be an offtaker or prospective offtaker buying some or all of the power produced by a generating unit. A party may be a governmental oversight entity monitoring carbon emissions data for electric power generating systems and transmission networks. A party may be a carbon credit exchange entity or participant. A party may be an industry consortium developing guidance for new-build generators and improving in-situ generators. A party may be a non-governmental or private entity developing information for any number or type of audience(s). A party may be an entity engaged in voluntary or mandatory accounting of the emissions impact of its power consumption or generation activities. The recited parties 191-199 are merely an example for convenience of the disclosure, and not intended as a limitation.

Figure 2:
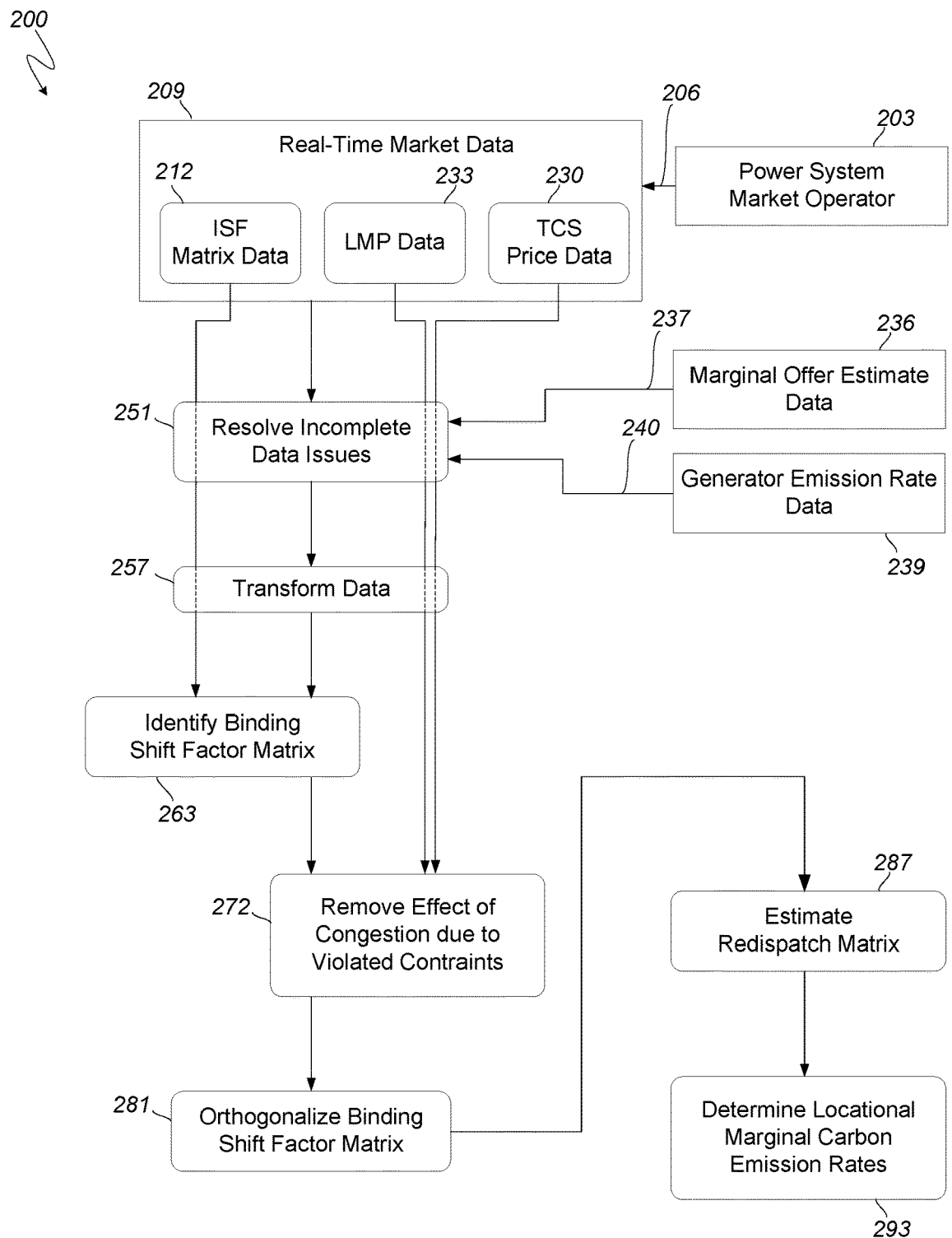
FIG. 2 is a flow diagram of a method to determine a locational marginal carbon emission rate for one or more locations of an independent system operator (ISO), according to an embodiment of the present disclosure.

FIG. 2 is a flow diagram of a method 200 to determine a locational marginal carbon emission rate for each location of (or within) an EPS (e.g., EPS 105 of FIG. 1) of an ISO, according to one embodiment of the present disclosure. The method 200 may be implemented or otherwise carried out by an LMCER system, such as the LMCER system 100 of FIG. 1. The method 200 begins with RTM data 209 being obtained or otherwise received. A power system market operator 203 (e.g., an RTO, an ISO) may provide 206 RTM data 209 at fixed reporting intervals (e.g., every five minutes). The power system market operator 203 may provide 206 the RTM data via a transmission such as over a communication network, via a third-party data aggregator, by a storage device sent through the mail, etc. The RTM data 209 may include injection shift factor (ISF) matrix data 212, transmission constraint shadow (TCS) price data 230, and locational marginal price (LMP) data 233.

The ISF matrix data 212 includes data for an ISF matrix, which represents changes in power flows over each transmission element of an EPS resulting from an increase or decrease in power generation or load at a bus. The ISF matrix data 212 provides ISFs at discrete locations of the EPS. Furthermore, the ISF matrix data 212 can include data reflecting the topology of the EPS. For the present purpose, an example of a topology is presented in FIG. 1, and in particular the connections between units 115, 120, 125, 130 via the power transmission network 145 and including the power transmission segment 150 and the transformers 155, 165.

The TCS price data 230 provides costs and other parameters related to transmission constraints that may be represented in the ISF matrix data 212. More particularly, shadow prices contained in the TCS price data 230 represent the value to the system of loosening 1 megawatt (MW) of a constraint.

As broadly understood in the industry, the LMP data 233 can relate to marginal price data for a geographic region and may encompass multiple locations, time intervals, etc. The LMP data 233, represents the cost of redispatching marginal units in response to an upward change in load at each node of the EPS.

The RTM data 209 may be incomplete, whether due to transmission error, unavailability of portions of data for certain points in time, or the like, and resolution 251 of these incomplete data issues can enhance operation and/or performance of systems and methods of the present disclosure. Resolution 251 of the incomplete data issues may be accomplished a variety of ways. For example, marginal offer estimate data 236 may be received 237 and generator emission rate data 239 may be received 240, and these data 236, 239 may directly provide some of the incomplete data of the RTM data 209. Further incomplete data may be acquired through manipulation (e.g., interpolation, extrapolation, approximation, inference, artificial intelligence) of the RTM data 209. Incomplete data also may be acquired through manipulation of the RTM data 209 informed by the marginal offer estimate data 236 and/or the generator emission rate data 239. Incomplete data also may be acquired from one or more third-party vendors, e.g., manufacturers of elements in the EPS (such as a generator, transmission line, bus architecture, etc.).

The marginal offer estimate data 236 comprises generator marginal offers representing the price (e.g., in dollars per megawatt-hour ($/MWh)) from each unit (e.g., generator) at its level of power output during an operating interval. The marginal offer estimate data 236 may be provided by the power system market operator 203 or by a third-party vendor, or may be inferred from a collection of various data comprising cost of operation of a power generation facility, generators at the generation facility, power generated at the generation facility, etc. When the marginal offer estimate data 236 is provided by the power system market operator 203, the interval used may be the reporting interval for the RTM data 209, or an integer multiple thereof.

Generator emissions rate data 239 represent the emissions of $CO_2$ (or other pollutants) per MWh of energy produced by each unit. These data may be static or may vary over time or with the operating state of each unit. Generator emission rate data 239 may be estimated from a variety of sources, including: government data sets reporting fuel consumption and power production by generating unit, or by type of generating unit within a geographic region; ISO-collected data sets reporting fuel consumption, power production, or both; offer data; fuel price data; fuel pollutant content data; etc. including a variety of combinations of these data sources.

Returning again to resolution 251 of incomplete data issues, the RTM data 209, the marginal offer estimate data 236, and the generator emissions rate data 239, individually and/or collectively, may be subject to resolution 251 of incomplete data issues. For example, missing data in one of the sets of data 209, 236, 239 for a particular time stamp can sometimes be resolved by approximating with data from (a) similar location(s) or time stamp(s). Missing data for a particular location or time stamp can also sometimes be resolved by replacing the missing data with typical data for the category of location or time stamp for which data are missing. Missing data can also sometimes be resolved by leveraging redundance in input data sets. For example, missing LMP data can be resolved by combining ISF matrix data and binding constraint shadow price data. A variety of other techniques can be applied to resolve missing or clearly erroneous data.

After resolving 251 incomplete data issues, the resulting data are passed through data transformation 257. The RTM data 209, marginal offer estimate data 236, and/or generator emission rate data 240 may be transformed 257, for example, to facilitate processing. For example, ISF matrix data 212 may be reported by the power system market operator in long format, with rows corresponding to time, location, and transmission constraint. However, some downstream steps may benefit from an ISF matrix for a particular time with rows corresponding to location and columns corresponding to transmission constraints, or vice versa. The data can be transformed in this and/or other similar ways to improve usefulness, formatting, etc. of the data for later use.

After data transformation 257, the data are used to identify 263 a binding shift factor matrix. The binding shift factor matrix may be derived from the ISF matrix data 212 of the RTM data 209. The binding shift factor matrix represents, at each time interval of the RTM, those locations of the EPS having power transmission constraints that are binding but not violated. The binding shift factor matrix is further discussed in connection with FIG. 3.

The effect of congestion due to violated constraints may be removed 272 from the LMP data 233 and marginal offer estimate data 236. Violated constraints are managed differently than binding-but-not-violated constraints. LMPs for adjustment are sourced from the LMP data 233 and marginal offers for adjustment are sourced from the marginal offer estimate data 236. The TCS price data 230 is used to identify violated constraints for removal 272 of the effect(s) of congestion due to constraint violation.

With the effect of congestion due to violated constraints removed 272, orthogonalization 281 of the binding shift factor matrix may optionally be undertaken. Stated otherwise, the binding shift factor matrix previously identified 263 may be orthogonalized 281 for the time intervals of the RTM data 209 to address actual and/or near-collinearities in the binding shift factor matrix. Orthogonalizing 281 the binding shift factor matrix, corresponding to n units and p binding constraints, can comprise, for example, generating a set of orthogonal n-vectors that span the same p-dimensional sub-space as is spanned by the original binding shift factor matrix. In one embodiment, orthogonalizing the binding shift matrix may include application of partial least squares (PLS). PLS is but one method by which orthogonalizing 281 the binding shift factor matrix may be undertaken, and the present disclosure anticipates application of other methods having comparable efficacy. In one embodiment, orthogonalization 281 may be achieved using singular value decomposition (SVD). In one embodiment, orthogonalization 281 may be achieved using the Gram-Schmidt process. In one embodiment, orthogonalization 281 is achieved using QR decomposition. Orthogonalizing the binding shift factor matrix 281 is further discussed below in connection with FIG. 3. Orthogonalizing 281 may not be necessary in cases where the binding shift factor matrix does not contain collinearities and/or where an approach used to estimate the redispatch matrix is robust to collinearities in the shift factor matrix.

For each time interval of the RTM data 209, a redispatch matrix p is estimated 287. Redispatch refers to the process by which a system operator directs units to adjust their output in response to incremental net consumption of power. System operators redispatch units to cost-effectively manage supply-demand balance (energy balance) and binding constraints. In the redispatch matrix p, each represents an estimated redispatch of marginal unit j given 1 MW of incremental load at bus i. The estimated redispatch matrix p is feasible because binding constraints and supply-demand balance (energy balance) are both respected in the redispatch. The estimated redispatch matrix p can be right-multiplied by a vector of adjusted marginal offers from the marginal offer estimate data 236 (after removing the effect of congestion due to violated constraints 272) to calculate or otherwise determine an estimated LMP* (which is the locational marginal price after adjusting for (e.g., removing) impact of violated constraints—i.e. LMP* is adjusted LMP). Accuracy of the estimated LMP* can be determined by comparing the estimated LMP* to observed LMP*. The accuracy can be summarized by an error metric, e.g., root mean squared error, sum of squares error, sum of absolute errors, mean absolute error, or the like.

Estimating 287 the redispatch matrix may comprise solving an optimization problem. In some embodiments, the optimization problem may involve minimizing an objective function including the error in LMP* estimation. In some embodiments, the optimization problem may involve minimizing an objective function including the error in the LMP* estimation and penalty terms corresponding to one or more of: the supply/demand constraint, transmission constraints, or regularization constraints. In some embodiments, the optimization problem is solved to a global minimum. In some embodiments, the optimization problem is solved to a local minimum. In some embodiments, a convex relaxation of the optimization problem is solved. In some embodiments, the optimization problem is solved exactly. In some embodiments, the optimization problem is solved to within a tolerance of the global or local minimum. In some embodiments, a heuristic approach is used to approximately solve the optimization problem. The optimization problem may, in some embodiments be solved by iterating over sets of candidate marginal units; determining a feasible redispatch matrix; calculating the LMP* estimation error; and repeating until an LMP* estimation error-minimizing set of candidate marginal units is identified (e.g., see iterative optimization loop 333 of FIG. 3, described below). The optimization loop may be implemented or otherwise occur by an optimization algorithm. In one embodiment, the optimization problem may be solved, or approximately solved, by casting the optimization problem as a sparsity regularized regression with penalties related to marginal offer estimates and LMPs. In some embodiments, the optimization problem may be solved using mixed integer programming. In some embodiments, the optimization problem may be solved using conic programming. In some embodiments, the optimization problem may be solved using semi-definite programming. In some embodiments, the optimization problem may be solved using second-order cone programming. In some embodiments, the optimization problem may be solved using quadratic programming. In some embodiments, the optimization problem may be solved using linear programming. In some embodiments, the optimization problem may be solved using non-linear programming.

The estimated redispatch matrix p enables determining 293 a locational marginal carbon emission rate at each location of the EPS. In one embodiment, applying the estimated redispatch matrix p to the generator emission rate data 239 may generate or otherwise determine 293 a vector of locational marginal carbon emission rates. While reference is made to a vector, this is by way of non-limiting example. The locational marginal carbon emission rates may be determined 293 and provided or otherwise made available in any suitable format or data set.

Figure 3:
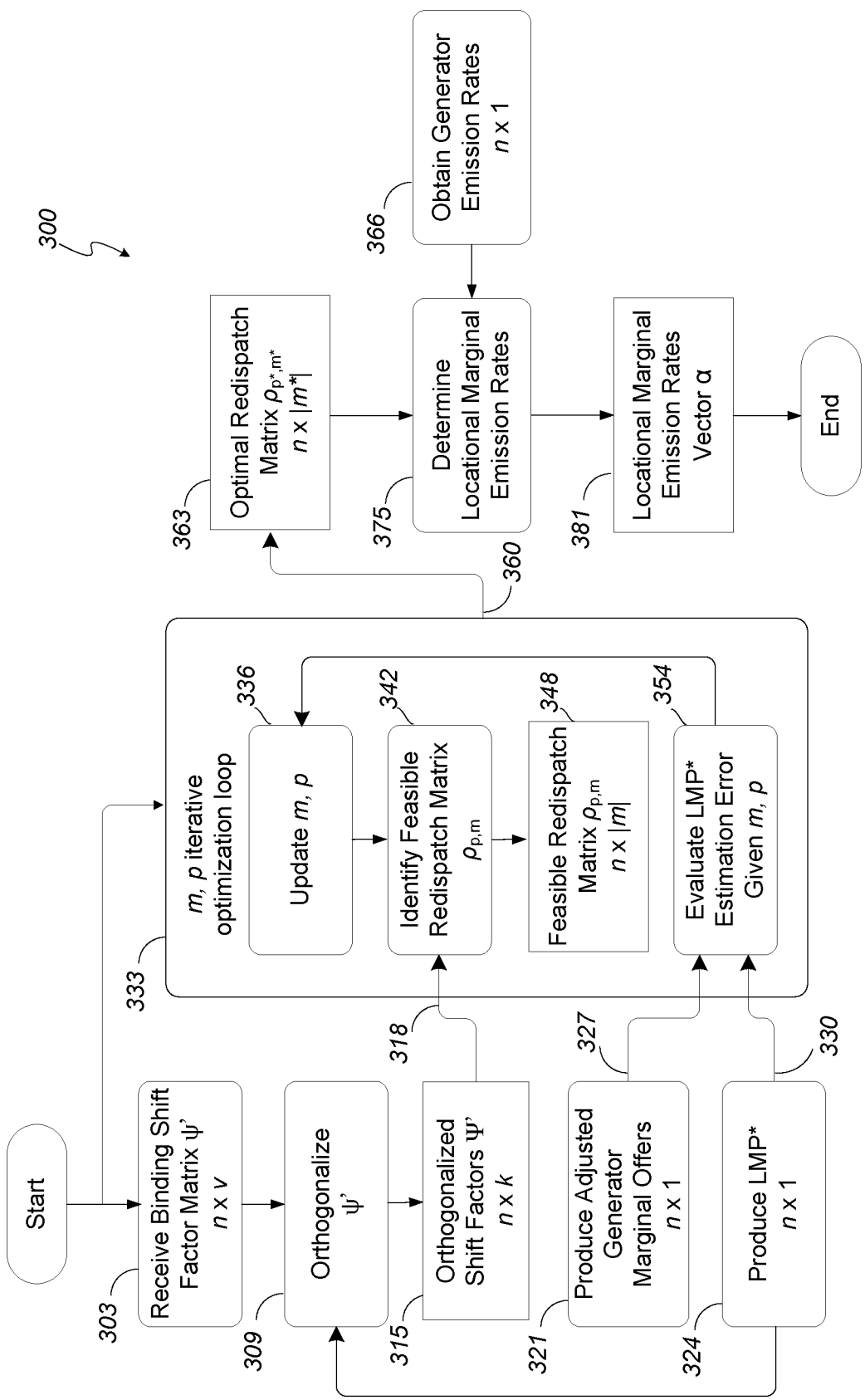
FIG. 3 is a flow diagram providing additional detail of a method of calculating a locational marginal carbon emission rate, according to an embodiment of the present disclosure.

FIG. 3 is a flow diagram providing additional detail of a method 300 of calculating a locational marginal emission rate (e.g., the locational marginal carbon emission rate(s) determined 293 in FIG. 2), according to an embodiment of the present disclosure. A component of the calculation method 300 is estimating the redispatch matrix (redispatch matrix p) (see estimating 287 the redispatch matrix in FIG. 2).

In FIG. 3 and the description of the same that follows:

n refers to the number of locations of an EPS (e.g., the EPS 105 in FIG. 1);

v refers to the number of binding-but-not-violated constraints, including possible collinear constraints;

k refers to the number of orthogonal binding-but-not-violated constraints after optional orthogonalization is complete;

m refers to a set of candidate marginal units (e.g., generators) with |m| referring to the number of candidate marginal units in the set;

m* refers to the set of marginal units (e.g., generators) after optimization is complete with |m*| referring to the number of marginal units in the set;

p refers to the set of candidate orthogonal binding constraints with |p| referring to the number of candidate orthogonal binding constraints;

p* refers to the set of orthogonal binding constraints after optimization is complete with |p*| referring to the number of orthogonal binding constraints in the set;

$\psi$ represents the binding shift factor matrix [n×v], and includes elements $\psi_{i,j}$, each representing that portion of power injected into the EPS at location j and withdrawn at a reference bus, and that flows over the binding constraint i of the EPS;

$\psi'$ represents a transposed binding shift factor matrix [n×v] of all locations on binding constraints;

$\Psi'$ represents a transposed, orthogonalized binding shift factor matrix [n×k];

$\Psi'_{m,p}$ represents a transposed, orthogonalized binding shift factor matrix subset comprising marginal locations and candidate binding constraints [|m|×|p|];

$\rho_{p,m}$ represents a feasible redispatch matrix for the set m of candidate marginal units (e.g., generators) and set p of candidate binding constraints [n×|m|];

$\rho_{p^*,m^*}$ represents an optimal redispatch matrix after optimization is complete for the set m* of optimal marginal units and set p* for the binding constraints [n×|m*|];

P represents observed LMPs, after adjustment to remove congestion from violated constraints ($/MWh) [n×1];

$\pi$ represents LMP* (or adjusted LMP) estimated from adjusted marginal offers and the network ($/MWh) [n×1];

$\pi_m$ represents estimated LMP* at marginal locations ($/MWh) [|m|×1];

$c_m$ represents marginal offers form marginal units (e.g., generators) after adjustment to remove congestion from violated constraints ($/MWh) [|m|×1]; and $e_m$ represents marginal emissions rates for m marginal units (e.g., generators) (ton/MWh) [|m|×1].

A binding shift factor matrix $\psi'$ obtained or otherwise received 303. The binding shift factor matrix $\psi'$ derives from ISF matrix data reflecting the topology of an EPS (see the ISF matrix data 212 in FIG. 2 and the EPS 105 in FIG. 1; see also identifying 263 the binding shift factor matrix in FIG. 2). The ISF matrix data is a linear representation of the power transmission network, and is used in the market clearing models of U.S. power system market operators. ISOs in the U.S. publish either shift factors or information that can be used to infer shift factors (e.g., ISF matrix data), which can be arranged in a shift factor matrix. Shift factors may also be acquired from non-ISO data sources. Some steps of the calculation method 300 require only that subset of the ISF matrix data corresponding to all locations of the EPS and binding-but-not-violated constraints (i.e., binding shift factor matrix). Generally, this subset data can be identified directly from ISO-provided data.

ISOs also report LMPs for each pricing interval, which is typically the same as an RTM reporting interval. The impact of congestion due to violated constraints can be removed from marginal offers and reported LMPs to produce 321 adjusted generator marginal offers and to produce 324 the LMP* (adjusted LMP) for each location of the EPS. The LMP data, the marginal offer estimate data, the ISF matrix data, and the TCS price are used to produce 324 the LMP* and 321 the adjusted marginal offers for each location of the EPS (see the LMP data 233, marginal offer estimate data 236, ISF matrix data 212, and TCS price data 230 in FIG. 2).

The impact of congestion due to violated constraints can be removed because redispatch in cases of violated constraints is managed differently than redispatch for binding-but-not-violated constraints.

The LMP* may be used to orthogonalize 309 the binding shift factor matrix data that was received 303. The calculation method 300 employs that subset of the ISF matrix data corresponding to binding-but-not-violated constraints and all locations, or ISF matrix data subset (i.e., binding shift factor matrix) $\psi$; or a transposed ISF matrix data subset $\psi'$. The transposed ISF matrix data subset $\psi'$ can be pre-processed because it may contain a non-full column rank. A non-full column rank may result from, e.g., parallel branches in the EPS, the presence of interface constraints on the combined flow across multiple branches, or other multicol-linearities in the EPS. Furthermore, a large-scale EPS 105 may contain instances of near-collinearity that can lead to ill-conditioning and numerical instability in subsequent calculation steps.

PLS may be employed to orthogonalize 309 the transposed ISF matrix data subset (i.e., binding shift factor matrix) $\psi'$. PLS recognizes that LMPs (that have been adjusted to remove congestion from violated constraints) are a linear combination of the columns of the transposed ISF matrix data subset $\psi'$. PLS generates a sequence of orthogonal column vectors that together span the column space of the transposed ISF matrix data subset $\psi'$. The columns are generated with reference to a target LMP* (e.g., a target adjusted LMP vector). The first column generated by PLS is the vector in the span of training data having the highest correlation with the target LMP*, and subsequent columns are less tightly correlated. As noted elsewhere in the disclosure, PLS is one method of orthogonalizing these data, and the disclosure anticipates other methods may be employed to achieve an orthogonalized data matrix. Orthogonalizing 309 the ISF matrix data subset $\psi'$ produces an orthogonalized binding shift factor matrix $\Psi'$ 315. Because the columns of the orthogonalized binding shift factor matrix $\Psi'$ 315 have been orthogonalized, the result will have a full column rank. Ill-conditioning of the binding shift factor matrix $\Psi'$ 315 can be addressed by dropping a column if the column, although not technically collinear with previous columns, has very low correlation with the LMP*.

The orthogonalized binding shift factor matrix $\Psi'$ 315 is an intermediate result used in an iterative optimization loop 333. In accordance with the present disclosure, a variety of suitable optimization algorithms beyond an exhaustive iterative search may be used to choose m*, p*, and $\rho_{p*,m*}$ to minimize LMP* estimation error. As shown in In FIG. 3, the iterative optimization loop 333 selects an optimal set of marginal units m* and binding constraints p*. In many embodiments, the solution to optimization loop 333 can be understood as an iterative process of identifying or otherwise generating a sequence of feasible (or candidate) redispatch matrices $\rho_{p,m}$. For each loop iteration, the LMP* estimation error for the feasible redispatch matrix $\rho_{p,m}$ is obtained. The optimization loop terminates when a choice of m* and $\rho$* is made to minimize that estimation error.

A first step in the iterative optimization loop 333 is to update 336 m and p. In one embodiment, generators may be ranked in increasing order of the absolute value of their energy margin (e.g., the difference between their locational marginal price and their marginal offer) and |m| is allowed to range from a lower bound up to an upper bound. The lower bound may be the minimum value of m such that the matrix to be inverted in 342 is non-singular. The upper bound may be determined by the availability of computational resources. In this embodiment, m is updated by adding a new candidate marginal unit from the ranked list. In one embodiment, |p| is allowed to vary from 0 to the rank of the orthogonalized shift factors matrix 315 and p is updated by adding the next constraint (column) from that matrix to the problem.

The second step in the iterative optimization loop 333 is to identify 342 a feasible redispatch matrix $\rho_{p,m}$ 348 given m, p. Identifying 342 a feasible redispatch matrix $\rho_{p,m}$ 348 given m, p includes receiving 318 as input the orthogonalized binding shift factor matrix $\Psi'$ 315. A feasible redispatch matrix $\rho_{p,m}$ 348 is identified 342, given a set m of candidate marginal units and set p of candidate binding constraints. The feasible redispatch matrix $\rho_{p,m}$ can be calculated, estimated, or otherwise identified 342 according to Equation 1. Equation 1:

$$\rho_{p,m} = [1_n \Psi'_{n,p}]([1_m \Psi'_{m,p}]'[1_m \Psi'_{m,p}])^{-1}[1_m \Psi'_{m,p}]'$$

The foregoing equation generalizes equation 18 of Ruiz and Rudkevich. (See Pablo A. Ruiz & Aleksandr Rudkevich, *Analysis of Marginal Carbon Intensities in Constrained Power Networks*, 43rd Hawaii International Conference on System Sciences (January 2010).) Under perfect information about the identity of the marginal units and assuming the market operator's clearing algorithm has a unique solution, $|m|=|p|+1$, and $[1_m \Psi'_{m,p}]$ is square and invertible and equation 17 of Ruiz and Rudkevich could be applied directly. However, since perfect information about the identity of marginal generators is not part of Real-Time Market Data and uniqueness is frequently violated in practice by generators at the same location offering at the same price, equation 17 of Ruiz and Rudkevich fails. In contrast, Equation 1 above admits a set of candidate marginal units including more than |p|+1 units, a set that likely includes units having an estimated marginal offer close to LMP. Equation 1 also handles units at the same location with the same (or similar) marginal offers.

Equation 2 expresses the estimated LMP* (or adjusted LMP), $\pi_m$, for the marginal units (e.g., generators) in terms of the redispatch matrix described in Equation 1 above. Equation 2:

$$\pi_m = [1_m \Psi'_{m,p}]([1_m \Psi'_{m,p}]'[1_m \Psi'_{m,p}])^{-1}[1_m \Psi'_{m,p}]'c_m$$

The subset of the redispatch matrix involved in Equation 2 is a projection matrix, projecting the vector of adjusted marginal offers $c_m$ onto the column space of $[1_m \Psi'_{m,p}]$. This is the same projection matrix that arises in the solution of the ordinary least squares linear regression problem. The redispatch matrix described in Equation 2 above therefore minimizes the sum of squared residuals between estimated LMP* at the marginal locations and adjusted marginal offers of the marginal generators.

The redispatch matrix defined in Equation 1 above results in a feasible (relative to supply-demand and transmission constraints) redispatch of the set m of candidate marginal units. Given an n-vector dL of incremental load by location, the set m of marginal units are re-dispatched according to $\rho'_{p,m}dL$. The definition of $\rho_{p,m}$ in Equation 1 above satisfies equation 17 in Ruiz and Rudkevich; thus redispatch according to Equation 1 above ensures both that supply and demand remain in balance, and that binding transmission constraints continue to be respected.

With a feasible redispatch matrix $\rho_{p,m}$ 348 (from Equation 2, above) identified 342, the method 300 proceeds to evaluate 354 LMP* estimation error given m, p. This is because the feasible redispatch matrix $\rho_{p,m}$ 348 as identified 342 per Equation 1 above may not be a good approximation to an optimal redispatch implied by the ISO's market clearing solution. The generator adjusted marginal offers produced 321 and the LMP* produced 324 are received 327, 330, respectively, as input for this step of evaluating 354 LMP* estimation error. In order to confirm that the redispatch matrix defined by Equation 1, above, is reasonably economic, Equation 3, below, may be applied to produce an estimate of the (adjusted) LMP. Equation 3:

$$\pi = \rho_{p,m} c_m$$

This calculation involves both the redispatch matrix and an estimate of the adjusted marginal offer of the m candidate marginal units. Estimated LMP* calculated using Equation 3, above, can be compared to observed LMP* at each location to assess the magnitude of the estimation error.

The iterative optimization loop 333, and more particularly, evaluating 354 LMP* estimation error given m, p produces 360 an optimal redispatch matrix $\rho_{p*,m*}$ 363. The optimal redispatch matrix $\rho_{p*,m*}$ 363 is an n×|m*| matrix where n is the total number of locations in the power system, m* is the set of marginal units after optimization is complete and |m*| is the number of marginal units in the set, and each element of the optimal redispatch matrix $\rho_{p*,m*}$ 363 represents an estimated redispatch of one marginal unit given 1 MW of incremental load at a given location.

Generator emission rates (e.g., the generator emission rate data 239 of FIG. 2) may be estimated, determined, derived, or otherwise obtained 366, such as from: government data sets reporting fuel consumption and power production by generating unit, or by type of generating unit within a geographic region; ISO-collected data sets reporting fuel consumption, power production, or both; offer data; fuel price data; fuel pollutant content data; etc. including a variety of combinations of these data sources.

The optimal redispatch matrix $\rho_{p*,m*}$ 363 and generator emission rates obtained 366 are used to determine 375 locational marginal emission rates. This entails a matrix multiplication involving the marginal emission rates of the marginal units, as shown in Equation 4. Equation 4:

$$E = \rho_{p*,m*} e_{m*}$$

With the locational marginal emission rates determined 375, a locational marginal emission rates vector α 381 can be generated. The determined 375 locational carbon emission rates and/or the locational carbon emission rates vector α 381 may be provided, for example, to an owner/operator of a particular unit for making decisions regarding maintenance, replacement, upgrade, etc., of the unit, a customer consuming power at a given location, a prospective owner/operator of a potential new unit considering the type of technology and/or location of the new unit, an offtaker or prospective offtaker buying some or all of the power produced by a generating unit, a governmental oversight entity monitoring carbon emissions data for electric power generating systems and transmission networks, a carbon credit exchange entity or participant, an industry consortium developing guidance for new-build generators and improving in-situ generators, a non-governmental or private entity developing information for any number or type of audience(s).

Figure 4:
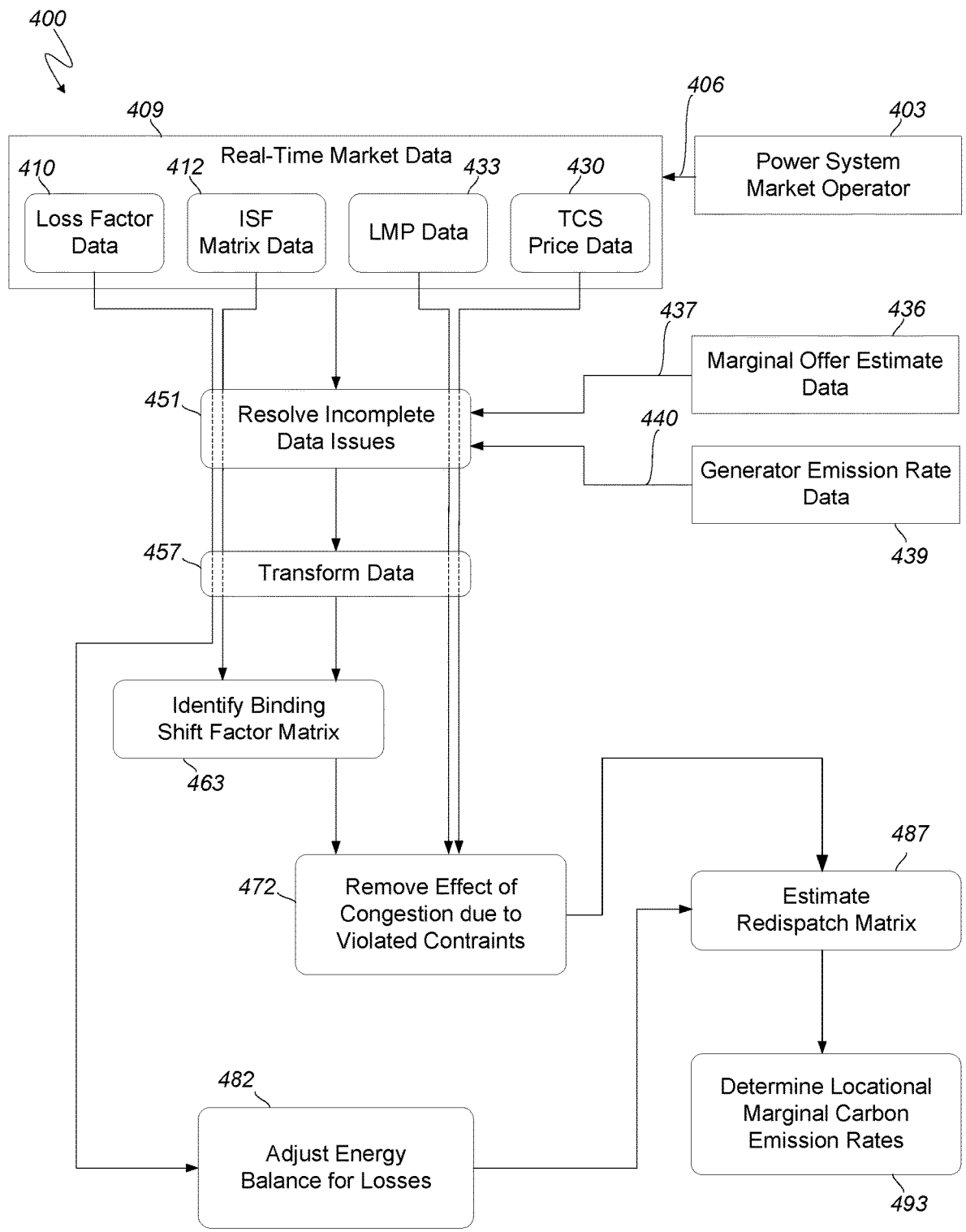
FIG. 4 is a flow diagram of a method to determine a locational marginal carbon emission rate for one or more locations of an independent system operator (ISO), according to an embodiment of the present disclosure.

FIG. 4 is a flow diagram of a method 400 to determine a locational marginal carbon emission rate for each location of (or within) an EPS (e.g., EPS 105 of FIG. 1) of an ISO, according to one embodiment of the present disclosure. The method 400 may be implemented or otherwise carried out by an LMCER system (e.g., the LMCER system 100 of FIG. 1). The method 400 begins with RTM data 409 being obtained or otherwise received. A power system market operator 403 (e.g., an RTO, an ISO) may provide 406 RTM data 409 at fixed reporting intervals (e.g., every five minutes). The power system market operator 403 may provide 406 the RTM data via a transmission such as over a communication network, via a third-party data aggregator, by a storage device sent through the mail, etc. The RTM data 409 may include injection shift factor (ISF) matrix data 412, transmission constraint shadow (TCS) price data 430, loss factor data 410, and locational marginal price (LMP) data 433.

The ISF matrix data 412 includes data for an ISF matrix, which represents changes in power flows over each transmission element of an EPS resulting from an increase or decrease in power generation or load at a bus. The ISF matrix data 412 provides ISFs at discrete locations of the EPS. Furthermore, the ISF matrix data 412 can include data reflecting the topology of the EPS. For the present purpose, an example of a topology is presented in FIG. 1, and in particular the connections between units 115, 120, 125, 130 via the power transmission network 145 and including the power transmission segment 150 and the transformers 155, 165.

Loss factor data 410 can include a vector of data corresponding to each location in the power system. The loss factor for each location represents the incremental system-wide transmission losses associated with incremental net power injections at that location. Loss factor data may be provided directly by the power system operator, or may be inferred using other information provided by the power system operator or other sources.

The TCS price data 430 provides costs and other parameters related to transmission constraints that may be represented in the ISF matrix data 412. More particularly, shadow prices contained in the TCS price data 430 represent the value to the system of loosening 1 megawatt (MW) of a constraint.

As broadly understood in the industry, the LMP data 433 can relate to marginal price data for a geographic region and may encompass multiple locations, time intervals, etc. The LMP data 433, represents the cost of redispatching marginal units (e.g., generators) in response to an upward change in load at each node of the EPS.

The RTM data 409 may be incomplete, whether due to transmission error, unavailability of portions of data for certain points in time, or the like, and resolution 451 of these incomplete data issues can enhance operation and/or performance of systems and methods of the present disclosure. Resolution 451 of the incomplete data issues may be accomplished a variety of ways, a previously described. For example, marginal offer estimate data 436 may be received 437 and generator emission rate data 439 may be received 440, and these data 436, 439 may directly provide some of the incomplete data of the RTM data 409. Further incomplete data may be acquired through manipulation (e.g., interpolation, extrapolation, approximation, inference, artificial intelligence) of the RTM data 409. Incomplete data also may be acquired through manipulation of the RTM data 409 informed by the marginal offer estimate data 436 and/or the generator emission rate data 439. Incomplete data also may be acquired from one or more third-party vendors, e.g., manufacturers of elements in the EPS (such as a generator, transmission line, bus architecture, etc.).

The marginal offer estimate data 436 comprises generator marginal offers representing the price (e.g., in dollars per megawatt-hour ($/MWh)) from each unit (e.g., generator) at its level of power output during an operating interval. The marginal offer estimate data 436 may be provided by the power system market operator 403 or by a third-party vendor, or may be inferred from a collection of various data comprising cost of operation of a power generation facility, generators at the generation facility, power generated at the generation facility, etc. When the marginal offer estimate data 436 is provided by the power system market operator 403, the interval used may be the reporting interval for the RTM data 409, or an integer multiple thereof.

Generator emissions rate data 439 represent the emissions of $CO_2$ (or other pollutants) per MWh of energy produced by each unit. These data may be static or may vary over time or with the operating state of each unit. Generator emission rate data 439 may be estimated from a variety of sources, including: government data sets reporting fuel consumption and power production by generating unit, or by type of generating unit within a geographic region; ISO-collected data sets reporting fuel consumption, power production, or both; offer data; fuel price data; fuel pollutant content data; etc. including a variety of combinations of these data sources.

Returning again to resolution 451 of incomplete data issues, the RTM data 409, the marginal offer estimate data 436, and the generator emissions rate data 439, individually and/or collectively, may be subject to resolution 451 of incomplete data issues. For example, missing data in one of the sets of data 409, 436, 439 for a particular time stamp can sometimes be resolved by approximating with data from (a) similar location(s) or time stamp. Missing data for a particular location or time stamp can also sometimes be resolved by replacing the missing data with typical data for the category of location or time stamp for which data are missing. For example, missing LMP data can be resolved by combining ISF matrix data and binding constraint shadow price data. A variety of other techniques can be applied to resolve missing or clearly erroneous data.

After resolving 451 incomplete data issues, the resulting data are passed through data transformation 457. The RTM data 409, marginal offer estimate data 436, and/or generator emission rate data 440 may be transformed 457, for example, to facilitate processing. For example, ISF matrix data 412 may be reported by the power system market operator in long format, with rows corresponding to time, location, and transmission constraint. However, some downstream steps may benefit from an ISF matrix for a particular time with rows corresponding to location and columns corresponding to transmission constraint, or vice versa. The data can be transformed in this and/or other similar ways to improve usefulness, formatting, etc. of the data for later use.

After data transformation 457, the data are used to identify 463 a binding shift factor matrix. The binding shift factor matrix may be derived from the ISF matrix data 412 of the RTM data 409. The binding shift factor matrix represents, at each time interval of the RTM, those locations of the EPS having power transmission constraints that are binding but not violated. The binding shift factor matrix is further discussed above in connection with FIG. 3 and below in connection with FIG. 5.

The effect of congestion due to violated constraints may be removed 472 from the LMP data 433 and marginal offer estimate data 436. Violated constraints are managed differently than binding-but-not-violated constraints. LMPs for adjustment are sourced from the LMP data 433 and marginal offers for adjustment are sourced from the marginal offer estimate data 436. The TCS price data 430 is used to identify violated constraints for removal 472 of the effect(s) of congestion due to constraint violation.

For each time interval of the RTM data 409, a redispatch matrix $\rho$ is estimated 487 where each $\rho_{i,j}$ represents an estimated redispatch of marginal unit j given 1 MW of incremental load at bus i. The estimated redispatch matrix $\rho$ is feasible because binding constraints and supply-demand balance (energy balance) are both respected in the redispatch. The estimated redispatch matrix $\rho$ can be right-multiplied by a vector of adjusted marginal offer estimates from the marginal offer estimate data 436 (after removing the effect of congestion due to violated constraints 472) to calculate or otherwise determine an estimated LMP* (which is the locational marginal price after adjusting for (e.g., removing) impact of violated constraints). Accuracy of the estimated LMP* can be determined by comparing the estimated LMP* to observed LMP*. The accuracy can be summarized by an error metric, e.g., root mean squared error, sum of squares error, sum of absolute errors, mean absolute error, or the like.

In some embodiments, the loss factor data 410 are taken into account when estimating redispatch. The loss factor data 410 may be taken into account to adjust 482 the energy balance for losses. The loss factor data 410 represent the incremental system-wide resistive losses associated with incremental consumption at each location. In this case, a feasible redispatch must respect a modified supply-demand balance (energy balance) in which losses are accounted for. The modified supply-demand balance requires that the incremental output of redispatched marginal units is equal to incremental consumption at each node plus incremental losses associated with the incremental consumption and redispatch.

Estimating 487 the redispatch matrix may comprise solving an optimization problem. In some embodiments, the optimization problem may involve minimizing an objective function including the error in LMP* estimation. In some embodiments, the optimization problem may involve minimizing an objective function including the error in the LMP* estimation and penalty terms corresponding to one or more of: the supply/demand constraint, transmission constraints, or regularization constraints. In some embodiments, the optimization problem is solved to a global minimum. In some embodiments, the optimization problem is solved to a local minimum. In some embodiments, a convex relaxation of the optimization problem is solved. In some embodiments, the optimization problem is solved exactly. In some embodiments, the optimization problem is solved to within a tolerance of the global or local minimum. In some embodiments, a heuristic approach is used to approximately solve the optimization problem. The optimization problem may, in some embodiments be solved by iterating over sets of candidate marginal units; determining a feasible redispatch matrix; calculating the LMP* estimation error; and repeating until an LMP* estimation error-minimizing set of candidate marginal units is identified (e.g., see iterative optimization loop 333 of FIG. 3, described above). The optimization loop may be implemented or otherwise occur by an optimization algorithm. In one embodiment, the optimization problem may be solved, or approximately solved, by casting the optimization problem as a sparsity regularized regression with penalties related to marginal offer estimates and LMPs. In some embodiments, the optimization problem may be solved using mixed integer programming. In some embodiments, the optimization problem may be solved using conic programming. In some embodiments, the optimization problem may be solved using semi-definite programming. In some embodiments, the optimization problem may be solved using second-order cone programming. In some embodiments, the optimization problem may be solved using quadratic programming. In some embodiments, the optimization problem may be solved using linear programming. In some embodiments, the optimization problem may be solved using non-linear programming. Further discussion of an optimization problem is provided below in the description of FIG. 5.

The estimated redispatch matrix ρ enables determining 493 a locational marginal carbon emission rate at each location of the EPS. In one embodiment, applying the estimated redispatch matrix ρ to the generator emission rate data 439 may generate or otherwise determine 493 a vector of locational marginal carbon emission rates. While reference is made to a vector, this is by way of non-limiting example. The locational marginal carbon emission rates may be determined 493 and provided or otherwise made available in any suitable format or data set.

Figure 5:
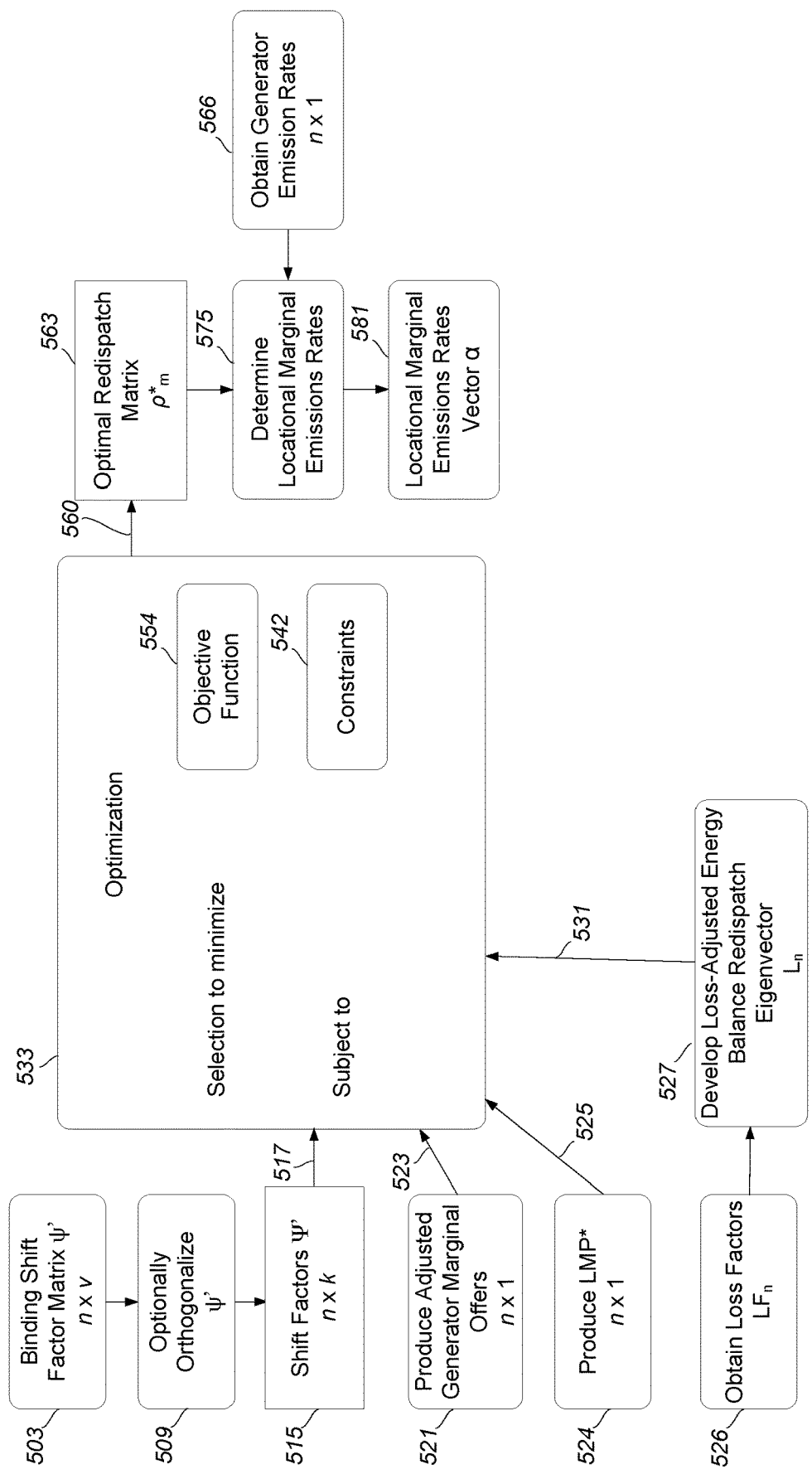
FIG. 5 is a flow diagram providing additional detail of a method of calculating a locational marginal carbon emission rate, according to an embodiment of the present disclosure.

FIG. 5 is a flow diagram providing additional detail of a method 500 of calculating a locational marginal emission rate (e.g., the locational marginal carbon emission rate(s) determined 493 in FIG. 4), according to an embodiment of the present disclosure. A component of the calculation method 500 is estimating a redispatch matrix (redispatch matrix p) (see estimating 487 the redispatch matrix in FIG. 4).

In FIG. 5 and the description of the same that follows:
n refers to the number of locations of an EPS (e.g., the EPS 105 in FIG. 1);
v refers to the number of binding-but-not-violated constraints, including possible collinear constraints;
k refers to the number of orthogonal binding-but-not-violated constraints;
m refers to a set of candidate marginal units (e.g., generators) with |m| referring to the number of candidate marginal units in the set;
m* refers to the set of marginal units (e.g., generators) after optimization is complete with |m*| referring to the number of marginal units in the set;
ψ represents the binding shift factor matrix [n×v], and includes elements $\psi_{i,j}$, each representing that portion of power injected into the EPS at location j and withdrawn at a reference bus, and that flows over the binding constraint i of the EPS.
ψ' represents a transposed binding shift factor matrix [n×v] of all locations on binding constraints;
Ψ" represents a transposed, orthogonalized binding shift factor matrix [n×k];
$\Psi"_{m,k}$ represents a transposed, orthogonalized binding shift factor matrix subset consisting of marginal locations and candidate binding constraints [|m|×k];
$LF_n$ represents the loss factor at each node [n×1];
$L_n$ represents the loss-adjusted energy-balance (supply-demand balance) redispatch eigenvector [n×1];
$L_m$ is the subset of $L_n$ corresponding to marginal generators only [|m|×1];
$\rho_m$ represents a feasible redispatch matrix for the set m of candidate marginal units (e.g., generators) [n×|m|];
$\rho^*_m$ represents an optimal redispatch matrix after optimization is complete for the set m* of optimal marginal units [n×|m*|];
P represents observed LMPs, after adjustment to remove congestion from violated constraints ($/MWh) [n×1];
π represents LMP* (or adjusted LMP) estimated from adjusted marginal offers and the network ($/MWh) [n×1];
$\pi_m$ represents estimated LMP* at marginal locations ($/MWh) [|m|×1];
$c_m$ represents marginal offers form marginal units (e.g., generators) after adjustment to remove congestion from violated constraints ($/MWh) [|m|×1]; and
$e_m$ represents marginal emissions rates form marginal units (e.g., generators) (ton/MWh) [|m|×1].

A binding shift factor matrix ψ' is obtained or otherwise received 503. The binding shift factor matrix ψ' derives from ISF matrix data reflecting the topology of an EPS (see the ISF matrix data 412 in FIG. 4 and the EPS 105 in FIG. 1; see also identifying 463 the binding shift factor matrix in FIG. 4). The ISF matrix data is a linear representation of the power transmission network, and is used in the market clearing models of U.S. power system market operators. ISOs in the U.S. publish either shift factors or information that can be used to infer shift factors (e.g., ISF matrix data), which can be arranged in a shift factor matrix. Shift factors may also be acquired from non-ISO data sources. Some steps of the calculation method 500 require only that subset of the ISF matrix data corresponding to all locations of the EPS and binding-but-not-violated constraints (i.e., binding shift factor matrix). Generally, this subset data can be identified directly from ISO-provided data.

ISOs also report LMPs for each pricing interval, which is typically the same as an RTM reporting interval. The impact of congestion due to violated constraints can be removed from reported LMPs and marginal offers to produce 524 the LMP* and 521 the adjusted generator marginal offers for each location of the EPS. The LMP data, the marginal offer estimate data, the ISF matrix data, and the TCS price are used to produce 524 the LMP* and 521 the adjusted marginal offers for each location of the EPS (see the LMP data 433, marginal offer estimate data 436, ISF matrix data 412, and TCS price data 430 in FIG. 4). The impact of congestion due to violated constraints can be removed because redispatch in cases of violated constraints is managed differently than redispatch for binding-but-not-violated constraints. The LMP* may be provided 525 to and used in an optimization 533, which can include solving an optimization problem.

The LMP* may also be used to optionally orthogonalize 509 the binding shift factor matrix data that was received 503. The calculation method 500 employs that subset of the ISF matrix data corresponding to binding-but-not-violated constraints and all locations, or ISF matrix data subset (i.e., binding shift factor matrix) ψ; or a transposed ISF matrix data subset ψ' 515. The transposed ISF matrix data subset ψ' 515 can be pre-processed because it may contain a non-full column rank. A non-full column rank may result from, e.g., parallel branches in the EPS, the presence of interface constraints on the combined flow across multiple branches, or other multicollinearities in the EPS. Furthermore, a large-scale EPS 105 may contain instances of near-collinearity that can lead to ill-conditioning and numerical instability in subsequent calculation steps. The binding shift factor matrix Ψ' 515 is an intermediate result that may be provided 517 to and used in the optimization 533.

Adjusted generator marginal offers may also be produced 521 representing the price (e.g., in dollars per megawatt-hour ($/MWh)) from each unit (e.g., generator) at its level of power output during an operating interval, after removing the effect of congestion due to violated constraints. The adjusted generator marginal offers may be provided 523 to and used in the optimization 533.

The method 500 may also include obtaining 526 loss-factor data, which may be used to develop 527 a loss-adjusted energy-balance (e.g., supply-demand balance)

redispatch eigenvector $L_n$. Loss-factor data may be published by the ISO, acquired from non-ISO data source, or inferred from other data. In the case with no losses, $L_n$ is a vector of length n whose entries are all equal to 1. In the case with losses, $L_n$ is given by Equation 5, below. Equation 5:

$$L_n = 1_n - LF_n$$

The loss-adjusted energy-balance redispatch eigenvector $L_n$ may be provided 531 to and used in the optimization 533.

As shown in FIG. 5, the optimization 533 involves solving an optimization problem that can include an objective function 554 and constraints 542. In many embodiments, the solution to the optimization problem can be understood as an iterative process generating a sequence of candidate redispatch matrices $\rho_m$, each corresponding to a given value of the objective function 554 and which may or may not satisfy constraints 542. The solution algorithm terminates when a redispatch matrix $\rho_m^*$ is identified that satisfies constraints 542 and minimizes objective function 554 to within an acceptable tolerance.

The constraints 542 ensure that the solution to the optimization problem is feasible relative to the (potentially loss-adjusted) supply-demand constraint, transmission constraints, and any regularization constraints. Note that any of these constraints could alternatively be represented as penalty terms in the objective function 554. Equation 6, below, represents the (potentially loss-adjusted) supply-demand constraint as well as the transmission constraints. Equation 6:

$$\rho_m [L_m \Psi'_m] = [L_n \Psi'_n]$$

The foregoing equation generalizes equation 18 of Ruiz and Rudkevich. (See Pablo A. Ruiz & Aleksandr Rudkevich, *Analysis of Marginal Carbon Intensities in Constrained Power Networks*, 43rd Hawaii International Conference on System Sciences (January 2010).) Under perfect information about the identity of the marginal units and assuming the market operator's clearing algorithm has a unique solution, $|m|=|k|+1$, and $[1_m \Psi'_m]$ is square and invertible and equation 17 of Ruiz and Rudkevich could be applied directly. However, since perfect information about the identity of marginal generators is not part of Real-Time Market Data and uniqueness is frequently violated in practice by generators at the same location offering at the same price, equation 17 of Ruiz and Rudkevich fails. In contrast, Equation 6 above admits redispatch matrices $\rho_m$ corresponding to more than $|k|+1$ marginal units. In the optimal solution, these $|k|+1$ marginal units likely have estimated marginal offers close to LMP. Equation 6 also handles units at the same location with the same (or similar) marginal offers.

The objective function 554 includes the LMP* estimation error resulting from a candidate redispatch matrix. It may also include penalty terms corresponding to one or more constraints 542. LMP* estimation error measures the extent to which a candidate redispatch matrix $\rho_m$ is consistent with the observed LMP*. Small values of this error also indicate that the candidate redispatch matrix is economic. Equation 7, below, may be applied to produce an estimate of the (adjusted) LMP given a candidate redispatch matrix $\rho_m$. The adjusted generator marginal offers previously produced 521 and the LMP* produced 524 are provided 523, 525, respectively, as input. Equation 7:

$$\pi = \rho_m c_m$$

Estimated (adjusted) LMP calculated using Equation 7, above, can be compared to observed LMP at each location to assess the magnitude of the estimation error.

The optimization 533 produces 560 an optimal redispatch matrix $\rho_m^*$ 363. The optimal redispatch matrix $\rho_m^*$ 363 is an n×|m*| matrix where n is the total number of locations in the power system, m* is the set of marginal units and |m*| is the number of marginal units, and each element of the optimal redispatch matrix $\rho_m^*$ 363 represents an estimated redispatch of one marginal unit given 1 MW of incremental load at location n.

A feasible solution to the optimization problem 333 can be characterized in terms of Equation 8, where $[L_m \Psi'_m]^g$ is a generalized inverse of $[L_m \Psi'_m]$. Equation 8:

$$\rho_m = [L_n \Psi'_n][L_m \Psi'_m]^g$$

To motivate this solution, we focus on the subset of locations corresponding to the marginal generators. Equation 9 expresses the estimated LMP* (or adjusted LMP), $\pi_m$ for the marginal units (e.g., generators) in terms of the redispatch matrix described in Equation 8 above. Equation 9:

$$\pi_m = [L_m \Psi'_m] c_m$$

The subset of the redispatch matrix involved in Equation 9 is a projection matrix, projecting the vector of adjusted marginal offers $c_m$ onto the column space of $[L_m \Psi'_m]$. In one embodiment, $[L_m \Psi'_m]^g$ is the Moore-Penrose pseudo-inverse of $[L_m \Psi'_m]$. In this case $[L_m \Psi'_m]^g$ is the same projection matrix that arises in the solution of the ordinary least squares linear regression problem and the redispatch matrix described in Equation 9 minimizes the sum of squared residuals between estimated LMP* at the marginal locations and adjusted marginal offers of the marginal generators. In another embodiment, $[L_m \Psi'_m]^g$ is a generalized inverse that does not exactly minimize the sum of squared residuals between estimated LMP* at the marginal locations and marginal offers of the marginal generators, but may minimize these residuals subject to regularization constraints on the estimated redispatch matrix. Any redispatch matrix defined in Equation 8 above results in a feasible (relative to supply-demand and transmission constraints) redispatch of the set m of candidate marginal units. Given an n-vector dL of incremental load by location, the set m of marginal units are re-dispatched according to $\rho'_m dL$. The definition of $\rho_m$ in Equation 8 above satisfies equation 17 in Ruiz and Rudkevich; thus redispatch according to Equation 8 above ensures both that supply and demand remain in balance, and that binding transmission constraints continue to be respected.

The optimization 533, and more particularly, solving the optimization problem to minimize the objective function 554 within the constraints 542 produces 560 an optimal redispatch matrix $\rho^*_m$ 563. The optimal redispatch matrix $\rho^*_m$ 563 is an n×|m*| matrix where n is the total number of locations in the power system, m* is the set of marginal units after optimization is complete and |m*| is the number of marginal units in the set, and each element of the optimal redispatch matrix $\rho^*_m$ 563 represents an estimated redispatch of one marginal unit given 1 MW of incremental load at given location n.

Generator emission rates (e.g., the generator emission rate data 439 of FIG. 4) may be estimated, determined, derived, or otherwise obtained 566, such as from: government data sets reporting fuel consumption and power production by generating unit, or by type of generating unit within a geographic region; ISO-collected data sets reporting fuel consumption, power production, or both; offer data; fuel price data; fuel pollutant content data; etc. including a variety of combinations of these data sources.

The optimal redispatch matrix $\rho^*_m$ 563 and generator emission rates obtained 566 are used to determine 575 locational marginal emission rates. This entails a matrix multiplication involving the marginal emission rates of the marginal units, as shown in Equation 10. Equation 10:

$$E = \rho_{m^*} e_{m^*}$$

With the locational marginal emission rates determined 575, a locational marginal emission rates vector α 581 can be generated. The determined 575 locational carbon emission rates and/or the locational carbon emission rates vector α 581 may be provided, for example, to an owner/operator of a particular unit for making decisions regarding maintenance, replacement, upgrade, etc., of the unit, a customer consuming power at a given location, a prospective owner/operator of a potential new unit considering the type of technology and/or location of the new unit, an offtaker or prospective offtaker buying some or all of the power produced by a generating unit, a governmental oversight entity monitoring carbon emissions data for electric power generating systems and transmission networks, a carbon credit exchange entity or participant, an industry consortium developing guidance for new-build generators and improving in-situ generators, a non-governmental or private entity developing information for any number or type of audience(s).

Figure 6:
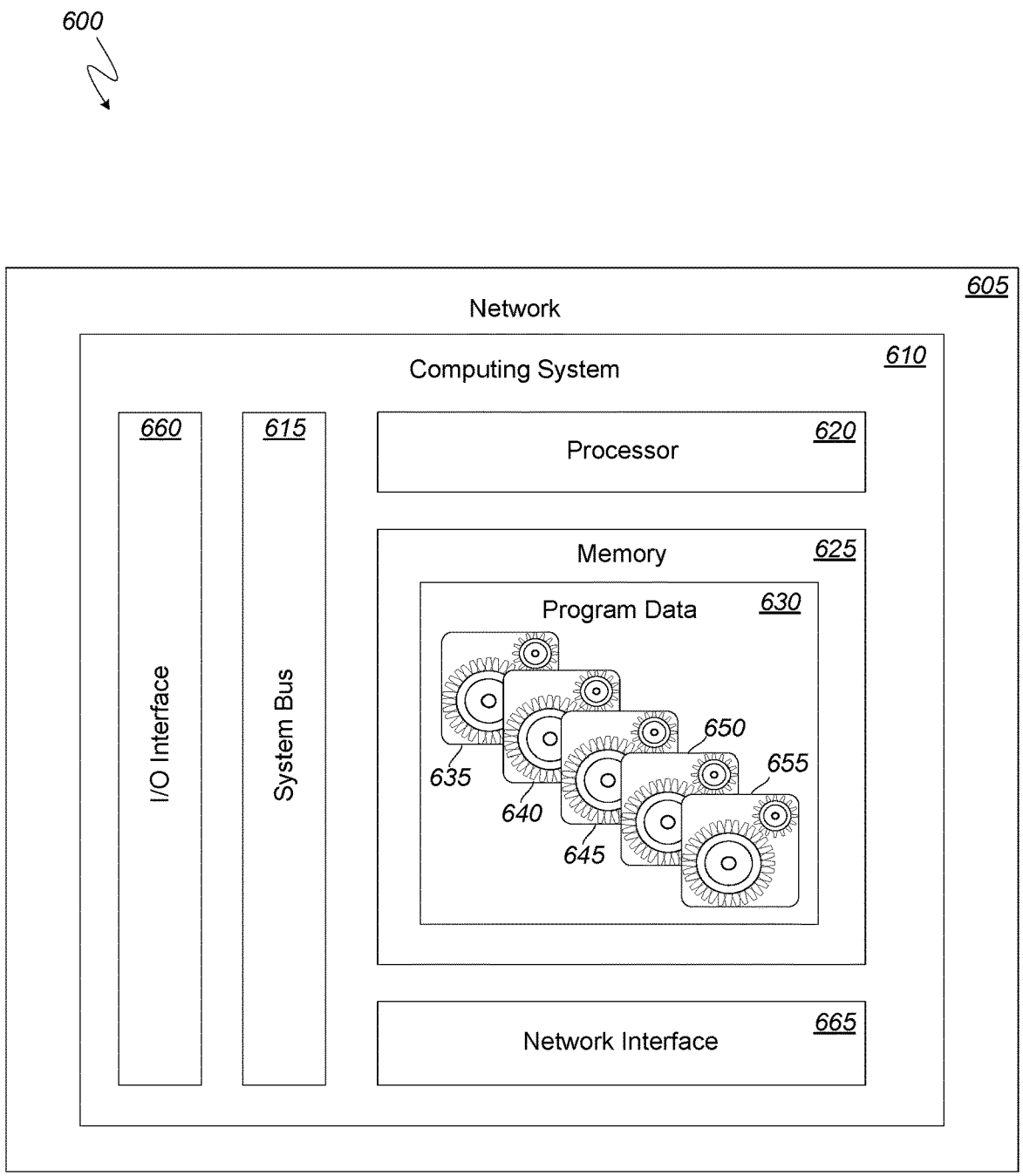
FIG. 6 diagrams an architecture of a system for determining a locational marginal carbon emission rate for each location of an EPS, according to an embodiment of the present disclosure.

FIG. 6 diagrams an architecture of a system 600 for determining a locational marginal carbon emission rate for each location of an EPS, according to an embodiment of the present disclosure. The system 600 includes a computing system 610 that may be similar in some respects to the computing system 175 of FIG. 1. The system 600 comprises a network 605 and the computing system 610. The computing system 610 includes a system bus 615, one or more processors 620, an electronic memory 625, an input/output (I/O) interface 660, and a network interface 665.

The one or more processors 620 may include one or more general purpose devices, such as an Intel®, AMD®, or other standard microprocessor. The one or more processors 620 may include a special purpose processing device, such as ASIC, SoC, SiP, FPGA, PAL, PLA, FPLA, PLD, or other customized or programmable device. The one or more processors 620 may perform distributed (e.g., parallel) processing to execute or otherwise implement functionalities of the present embodiments. The one or more processors 620 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The electronic memory 625 may include static RAM, dynamic RAM, flash memory, one or more flip-flops, ROM, CD-ROM, DVD, disk, tape, or magnetic, optical, or other computer storage medium. The electronic memory 625 may include a plurality of program modules 635-655 and a program data 630. The electronic memory 625 may be local to the computing system 610 or may be remote from the computing system 610 and/or distributed over the network 605.

The program modules 635-655 may include all or portions of other elements of the system 600. The program modules 635-655 may run multiple operations concurrently or in parallel by or on the one or more processors 620. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein, may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

The program data 630 stored on the electronic memory 625 may include data generated by the system 600, such as by the program modules 635-655 or other modules. The stored program data 630 may be organized as one or more databases.

The I/O interface 660 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 665 may facilitate communication with other computing devices and/or networks 605, such as the Internet and/or other computing and/or communications networks. The network interface 665 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the computer may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 615 may facilitate communication and/or interaction between the other components of the system 600, including the one or more processors 620, the electronic memory 625, the I/O interface 660, and the network interface 665.

As noted, the system 600 includes various program modules 635-655 (or engines, elements, or components) to implement functionalities of the system 600 and to generate, access, and/or manipulate the program data 630 stored in the electronic memory 625. The system program modules 635-655 can include a data collection engine 635, a data resolution engine 640, an orthogonalization engine 645, an estimation engine 650, and a rates engine 655.

The processor 620 is configurable to enable the processor 620 to read and execute computer-executable instructions, such as computer-executable instructions to perform the methods describe elsewhere herein. The computer-executable instructions may be stored in the electronic memory 625, or in another memory accessible to the processor 620. The I/O interface 660 and/or the network interface 665 may enable the processor 620 to communicate with the electronic memory 625 and/or another memory, and to communicate with, for example, an ISO, such as the ISO 110 of FIG. 1, etc. The electronic memory 625 may store computer-readable and executable instructions to enable the processor 620 to perform the methods described above. More particularly, the electronic memory 625 may store instructions to enable the processor 620 to operate the data collection engine 635 to receive RTM data of the power system market operator, including ISF matrix data, LMP data, TCS price data; and the marginal offer estimate data and generator emission rate data, and to store the parsed data for further use of the processor 620. The electronic memory 625 may also store instructions to enable the processor 620 to operate the data resolution engine 640 to resolve incomplete data issues; clean the RTM data, the marginal offer estimate data, and the generator emission rate data; identify from the RTM data the binding shift factor matrix; remove the impact of congestion due to violated constraints from the LMP data; and store results of such manipulation for further use of the processor 620 (see identify binding shift factor matrix 263 in FIG. 2). The electronic memory 625 may also store instructions to enable the processor 620 to operate the orthogonalization engine 645 to orthogonalize the binding shift factor matrix 503 for each time interval to address actual and near-collinearities, and to store the results of these functions for further use of the processor 620. The electronic memory 625 may also store instructions to enable the processor 620 to operate the estimation engine 650 to, for each time interval, determine an estimated redispatch matrix, wherein the estimating minimizes LMP estimation error, which is determined by comparing actual LMP from the LMP data 233 to estimated LMP of the estimated redispatch matrix; and to store the results of these functions for further use of the processor 620 (see estimated redispatch matrix 287 in FIG. 2). The memory 625 may also store instructions to enable the processor 620 to operate the rate engine 655 to determine locational marginal carbon (or other pollutant) emission rates at each location of the power system according to the estimated redispatch matrix 287 (see locational marginal carbon emission rates 293 in FIG. 2), and to store the results of these functions for further use of the processor 620. The network interface 665 may enable communication of the results generated by the modules 635-655 to a memory for retention storage, and to one or more parties.

EXAMPLES

Some examples of embodiments of the present disclosure are provided below.

Example 1. A system to determine locational marginal emission rates for an electric power system, comprising: a memory to store data; a communication network interface to receive data from one or more data sources via a communication network; one or more processors operably coupled to the memory and to: receive Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system, wherein each location is a discrete location of the power system; identify from the Real-Time Market data a binding shift factor matrix, which is a subset of the ISF matrix data corresponding to locations of the power system and binding but not-violated transmission constraints; remove impact of congestion due to violated constraints from the LMP data (and, optionally, from marginal offer estimate data), based on the transmission constraint shadow price data, to create adjusted LMP (or LMP*) data (and, optionally, adjusted marginal offers); estimate, for each time interval, an estimated redispatch matrix that is feasible because binding constraints and supply-demand balance are respected (e.g., in the redispatch), wherein the estimating minimizes LMP* estimation error, which is determined by comparing actual LMP* from the adjusted LMP data to estimated LMP* for each node of the power system; and determine locational marginal emission rates at each location of the power system according to the estimated redispatch matrix.

Example 2. The system of Example 1, wherein the one or more processors are further to: obtain marginal offer estimate data, wherein the LMP* estimation error is based on the difference between the adjusted LMP data and the estimated redispatch matrix multiplied by the adjusted marginal offer estimate data (e.g., a vector).

Example 3. The system of Example 1, wherein the one or more processors are further to: obtain generator emission rate data, wherein determining the locational marginal emission rates includes multiplying the estimated redispatch matrix by the generator emission rate data.

Example 4. The system of Example 1, wherein the one or more processors are further to: resolve incomplete data issues (such as missing LMPs, missing shift factors, or incomplete mappings between data sources) by one or more of estimating, extrapolating, and using typical data (e.g., at a location and/or time stamp).

Example 5. The system of Example 4, wherein the one or more processors are further to: clean the Real-Time Market data by one or more of: resolving ambiguities due to sparse data representation; and controlling noise in LMPs and shift factors.

Example 6. The system of claim 1, wherein the one or more processors are further to: orthogonalize the binding shift factor matrix for each time interval to address actual and near-collinearities.

Example 7. The system of Example 6, wherein orthogonalizing the binding shift factor matrix (corresponding to n locations and p binding constraints) comprises generating a set of orthogonal n-vectors that span the same p-space as is spanned by the original binding shift factor matrix.

Example 8. The system of claim 6, wherein the one or more processors orthogonalize the binding shift factor matrix using the Partial Least Squares technique with a target variable of (adjusted) Locational Marginal Prices.

Example 9. The system of claim 1, wherein the one or more processors estimate the estimated redispatch matrix using an optimization algorithm.

Example 10. The method of claim 1, wherein the one or more processors estimate the estimated redispatch matrix by determining the redispatch matrix that minimizes LMP* estimation error using an iterative search over sets of candidate marginal units (e.g., whose marginal offers are close to LMP) and orthogonal binding constraints.

Example 11. The method of Example 1, wherein the one or more processors estimate the estimated redispatch matrix using a loss-adjusted energy balance redispatch eigenvector.

Example 12. The method of Example 1, wherein the one or more processors estimate the estimated redispatch matrix by formulating the LMP* estimating error minimization problem as a mixed integer quadratic programming problem and solving the problem using any standard technique.

Example 13. The system of Example 1, wherein the one or more processors are further to: generate a locational marginal emission rate vector by applying the estimated redispatch matrix to the generator emissions rate data.

Example 14. The system of Example 1, wherein the estimated redispatch matrix comprises $\rho$, where $\rho_{i,j}$ represents an estimated redispatch of marginal unit j given 1 megawatt (MW) of incremental load at bus i.

Example 15. A method of determining a locational marginal emission rate, comprising: receiving Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system, wherein each location is a discrete location of the power system; identifying from the Real-Time Market data a binding shift factor matrix, which is a subset of the ISF matrix data corresponding to locations of the power system and binding but not-violated transmission constraints; removing impact of congestion due to any violated constraints from the LMP data (and, optionally, marginal offer estimate data), based on the transmission constraint shadow price data, to create adjusted LMP data (and, optionally, adjusted marginal offers); estimating, for each time interval, an estimated redispatch matrix that is feasible because binding constraints and supply-demand balance are respected in the redispatch, wherein the estimating minimizes LMP* estimation error, which is determined by comparing actual LMP* from the adjusted LMP data to estimated LMP* at each node given the estimated redispatch matrix; and determining locational marginal emission rates at each location of the power system according to the estimated redispatch matrix.

Example 16. The method of Example 15, further comprising: resolving incomplete data issues (such as missing LMPs, missing shift factors, or incomplete mappings between data sources) by one or more of estimating, extrapolating, and using typical data (e.g., of a location and/or time stamp) and using redundancy across data sources.

Example 17. The method of Example 15, further comprising: obtaining marginal offer estimate data, wherein the LMP* estimation error is based on the difference between the adjusted LMP data and the estimated redispatch matrix multiplied by the adjusted marginal offer estimate data (e.g., a vector).

Example 18. The method of Example 15, further comprising: obtaining generator emission rate data, wherein determining the locational marginal emission rates includes multiplying the estimated redispatch matrix by the generator emission rate data.

Example 19. The method of Example 15, wherein estimating the estimated redispatch matrix involves the use of a loss-adjusted supply-demand balance redispatch eigenvector.

Example 20. The method of Example 15, further comprising: cleaning the Real-Time Market data by one or more of: resolving inconsistencies in sparse data representation; and controlling noise in LMPs and shift factors.

Example 21. The method of Example 15, further comprising: orthogonalizing the binding shift factor matrix for each time interval to address actual and near-collinearities.

Example 22. The method of Example 21, wherein orthogonalizing the binding shift factor matrix (corresponding to n locations and p binding constraints) comprises generating a set of orthogonal n-vectors that span the same p-space as is spanned by the original binding shift factor matrix.

Example 23. The method of Example 21, wherein orthogonalizing the binding shift factor matrix comprises using the Partial Least Squares technique with a target variable of (adjusted) Locational Marginal Prices.

Example 24. The method of Example 15, wherein estimating the redispatch matrix comprises solving an optimization problem.

Example 25. The method of Example 15, wherein estimating the redispatch matrix comprises determining the redispatch matrix that minimizes LMP* estimation error using an iterative search over sets of candidate marginal units (e.g., whose marginal offers are close to their LMP) and orthogonal binding constraints.

Example 26. The method of Example 15, wherein estimating the redispatch matrix comprises casting the LMP* estimation error minimization problem as a sparsity regularized regression with penalties related to marginal effort estimates and LMP and solving the regression problem using any standard technique.

Example 27. The method of Example 15, wherein estimating the redispatch matrix comprises using one of mixed integer programming, conic programming, semi-definite programming, second-order cone programming, quadratic programming, linear programming, non-linear programming.

Example 28. The method of Example 15, further comprising: generating a locational marginal emission rate vector by applying the estimated redispatch matrix to the generator emissions rate data.

Example 29. The method of Example 15, wherein the estimated redispatch matrix comprises $\rho$, where $\rho_{i,j}$ represents an estimated redispatch of marginal unit j given 1 megawatt (MW) of incremental load at bus i.

Example 30. A method of determining a locational marginal emission rate, comprising: receiving Real-Time Market data of a power system market operator, the Real-Time Market data including injection shift factor (ISF) matrix data, locational marginal price (LMP) data, and transmission constraint shadow price data, wherein the ISF matrix data provides data to represent a topology of the power system, including locations and constraints of the power system, and to represent a portion of power injected at each location and withdrawn at a reference bus that flows over each constraint of the power system; obtaining marginal offer estimate data; obtaining generator emission rate data; resolving incomplete data issues; cleaning the Real-Time Market data, the marginal offer estimate data, and the generator emission rate data; identifying from the Real-Time Market data a binding shift factor matrix, which is a subset of the ISF matrix data corresponding to locations of the power system and binding but not-violated transmission constraints; removing impact of congestion due to violated constraints from the LMP data and marginal offer estimate data, based on the transmission constraint shadow price data; orthogonalizing the binding shift factor matrix for each time interval to address actual and near-collinearities; determining an optimal redispatch matrix by: determining a feasible redispatch matrix based on the number of potentially marginal units m and a number of orthogonal binding constraints p; estimating LMP* based on the feasible redispatch matrix with an objective of minimizing LMP* estimation error, which is determined by comparing actual LMP* from the LMP data to corresponding estimated LMP*; and determining locational marginal emission rates at each location of the power system according to the optimal redispatch matrix, wherein each location is a discrete location of the power system.

Example 31. A system to determine locational marginal emission rates for an electric power system, comprising: a data collection engine to: receive Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system; obtain marginal offer estimate data; obtain generator emission rate data; a data resolution engine to: resolve incomplete data issues; clean the Real-Time Market data, the marginal offer estimate data, and the generator emission rate data; identify from the Real-Time Market data a binding shift factor matrix, which is a subset of the ISF matrix data corresponding to locations of the power system and binding but not-violated transmission constraints; and remove impact of congestion due to violated constraints from the LMP data and marginal offer estimate data, based on the transmission constraint shadow price data; an orthogonalizing engine to orthogonalize the binding shift factor matrix for each time interval to address actual and near-collinearities; an estimation engine to estimate, for each time interval, an estimated redispatch matrix, wherein the estimating minimizes LMP* estimation error, which is determined by comparing actual LMP* from the LMP data to estimated LMP* of the estimated redispatch matrix; and a rate engine to determine locational marginal emission rates at each location of the power system according to the estimated redispatch matrix; wherein the location is a discrete location of the power system.

Example 32. A system to determine a locational marginal emission rate (e.g., for a location of an electric power system), comprising: a data collection engine to: receive Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system, wherein each location is a discrete location of the power system; identify from the Real-Time Market data a binding shift factor matrix, which is a subset of the ISF matrix data corresponding to locations of the power system and binding but not-violated transmission constraints; and remove impact of congestion due to any violated constraints from the LMP data and marginal offer estimate data, based on the transmission constraint shadow price data, to create adjusted LMP data and adjusted marginal offers; an estimation engine to estimate, for each time interval, an estimated redispatch matrix that is feasible because binding constraints and supply-demand balance are respected (e.g., in the redispatch), wherein the estimating minimizes LMP* estimation error, which is determined by comparing actual LMP* from the adjusted LMP data to estimated LMP* at each node of the estimated redispatch matrix; and a rate engine to determine locational marginal emission rates at each location of the power system according to the estimated redispatch matrix.

Example 33. The system of Example 32, further comprising: a data resolution engine to resolve incomplete data issues (such as missing LMPs, missing shift factors, or incomplete mappings between data sources) by one or more of estimating, extrapolating, and using typical data (e.g., at a location and/or time stamp).

Example 34. The system of Example 33, wherein the data resolution engine is further to: clean the Real-Time Market data by one or more of: resolving inconsistencies in sparse data representation; and controlling noise in LMPs and shift factors.

Example 35. The system of Example 32, wherein the data collection engine is further to: obtain marginal offer estimate data, wherein the LMP* estimation error is based on the difference between the adjusted LMP data and the estimated redispatch matrix multiplied by the vector of adjusted marginal offer estimate data.

Example 36. The system of Example 32, wherein the data collection engine is further to: obtain generator emission rate data, wherein determining the locational marginal emission rates includes multiplying the estimated redispatch matrix by the generator emission rate data.

Example 37. The system of Example 32, wherein the estimation engine estimates the estimated redispatch matrix using a loss-adjusted energy balance redispatch eigenvector.

Example 38. The system of Example 32, further comprising: an orthogonalization engine to orthogonalize the binding shift factor matrix for each time interval to address actual and near-collinearities.

Example 39. The system of Example 38, wherein orthogonalizing the binding shift factor matrix (corresponding to n locations and p binding constraints) comprises generating a set of orthogonal n-vectors that span the same p-space as is spanned by the original binding shift factor matrix.

Example 40. The system of Example 38, wherein orthogonalizing the binding shift factor matrix comprises using the Partial Least Squares technique with a target variable of (adjusted) Locational Marginal Prices.

Example 41. The system of Example 32, wherein the estimation engine estimates the estimated redispatch matrix using an optimization algorithm.

Example 42. The method of Example 32, wherein the estimation engine estimates the estimated redispatch matrix by determining the redispatch matrix that minimizes LMP* estimation error using an iterative search over sets of candidate marginal units (whose marginal offers are close to their LMP) and orthogonal binding constraints.

Example 43. The method of Example 32, wherein the estimation engine estimates the estimated redispatch matrix by casting the LMP* estimation error minimization problem as a sparsity regularized regression with penalties related to marginal offer estimates and LMP and solving the regression problem using any standard technique.

Example 44. The method of Example 32, wherein the estimation engine estimates the estimated redispatch matrix by formulating the LMP* estimating error minimization problem as one of: a mixed integer quadratic programming problem mixed integer programming problem, conic programming problem, semi-definite programming problem, second-order cone programming problem, a quadratic programming problem, linear programming problem, and a non-linear programming problem; and solving the problem using any standard technique.

Example 45. The system of Example 32, wherein the rate engine is further to: generate a locational marginal emission rate vector by applying the estimated redispatch matrix to the generator emissions rate data.

Example 46. The system of Example 32, wherein the estimated redispatch matrix comprises ρ, where $\rho_{i,j}$ represents an estimated redispatch of marginal unit j given 1 megawatt (MW) of incremental load at bus i.

It will be obvious to those having skill in the art that many changes may be made to the details of the above-described embodiments without departing from the underlying principles of the invention. The scope of the present invention should, therefore, be determined only by the following claims.

The invention claimed is:

1. A system to determine locational marginal emission rates for an electric power system, comprising:
   a memory to store data;
   a communication network interface to receive data from one or more data sources via a communication network;
   one or more processors operably coupled to the memory and to:
      receive Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system, wherein each location is a discrete location of the power system;
      identify from the Real-Time Market data a binding shift factor matrix, which is a subset of the ISF matrix data corresponding to locations of the power system and binding but not-violated transmission constraints;
      remove impact of congestion due to violated constraints from the LMP data, based on the transmission constraint shadow price data, to create adjusted LMP data;
      estimate, for each time interval, an estimated redispatch matrix that is feasible because binding constraints and supply-demand balance are respected, wherein the estimating minimizes adjusted LMP estimation error, which is determined by comparing actual adjusted LMP from the adjusted LMP data to estimated adjusted LMP for each node of the power system; and
      determine locational marginal emission rates at each location of the power system according to the estimated redispatch matrix.

2. The system of claim 1, wherein the one or more processors are further to:
   resolve incomplete data issues by one or more of estimating, extrapolating, and using typical data.

3. The system of claim 1, wherein the one or more processors are further to:
   orthogonalize the binding shift factor matrix for each time interval to address actual and near-collinearities.

4. The system of claim 3, wherein the one or more processors orthogonalize the binding shift factor matrix using the Partial Least Squares technique with a target variable of (adjusted) Locational Marginal Prices.

5. The system of claim 1, wherein the one or more processors estimate the estimated redispatch matrix using an optimization algorithm.

6. The method of claim 1, wherein the one or more processors estimate the estimated redispatch matrix by determining the redispatch matrix that minimizes adjusted LMP estimation error using an iterative search over sets of candidate marginal units and orthogonal binding constraints.

7. The method of claim 1, wherein the one or more processors estimate the estimated redispatch matrix using a loss-adjusted energy balance redispatch eigenvector.

8. The method of claim 1, wherein the one or more processors estimate the estimated redispatch matrix by solving the problem using conic programming.

9. The system of claim 1, wherein the one or more processors are further to:
   generate a locational marginal emission rate vector by applying the estimated redispatch matrix to the generator emissions rate data.

10. The system of claim 1, wherein the estimated redispatch matrix comprises ρ, where $\rho_{i,j}$ represents an estimated redispatch of marginal unit j given 1 megawatt (MW) of incremental load at bus i.

11. A method of determining a locational marginal emission rate, comprising:
   receiving Real-Time Market data of a power system market operator, the Real-Time Market data including injection shift factor (ISF) matrix data, locational marginal price (LMP) data, and transmission constraint shadow price data, wherein the ISF matrix data provides data to represent a topology of a power system, including locations and constraints of the power system, and to represent a portion of power injected at each location and withdrawn at a reference bus that flows over each constraint of the power system, wherein each location is a discrete location of the power system;
   identifying from the Real-Time Market data a binding shift factor matrix, which is a subset of the ISF matrix data corresponding to locations of the power system and binding but not-violated transmission constraints;
   removing impact of congestion due to any violated constraints from the LMP data, based on the transmission constraint shadow price data, to create adjusted LMP data;
   estimating, for each time interval, an estimated redispatch matrix that is feasible because binding constraints and supply-demand balance are respected in the redispatch, wherein the estimating minimizes adjusted LMP estimation error, which is determined by comparing actual adjusted LMP from the adjusted LMP data to estimated adjusted LMP at each node given the estimated redispatch matrix; and
   determining locational marginal emission rates at each location of the power system according to the estimated redispatch matrix.

12. The method of claim 11, further comprising:
   cleaning the Real-Time Market data by one or more of:
      resolving inconsistencies in sparse data representation; and
      controlling noise in LMPs and shift factors.

13. The method of claim 11, further comprising:
orthogonalizing the binding shift factor matrix for each time interval to address actual and near-collinearities.

14. The method of claim 13, wherein orthogonalizing the binding shift factor matrix comprises using the Partial Least Squares technique with a target variable of (adjusted) Locational Marginal Prices.

15. The method of claim 11, wherein estimating the redispatch matrix comprises solving an optimization problem.

16. The method of claim 11, wherein estimating the redispatch matrix comprises determining the redispatch matrix that minimizes adjusted LMP estimation error using an iterative search over sets of candidate marginal units and orthogonal binding constraints.

17. The method of claim 11, wherein estimating the redispatch matrix comprises casting the LMP estimation error minimization problem as a sparsity regularized regression with penalties related to marginal effort estimates and LMP and solving the regression problem using any standard technique.

18. The method of claim 11, wherein estimating the redispatch matrix comprises formulating the adjusted LMP estimating error minimization problem as a conic programming problem and solving the problem using any standard technique.

19. The method of claim 11, further comprising:
generating a locational marginal emission rate vector by applying the estimated redispatch matrix to the generator emissions rate data.

20. The method of claim 11, wherein the estimated redispatch matrix comprises $\rho$, where $\rho_{i,j}$ represents an estimated redispatch of marginal unit j given 1 megawatt (MW) of incremental load at bus i.

* * * * *